(12) United States Patent
Wooten et al.

(10) Patent No.: US 9,917,687 B2
(45) Date of Patent: Mar. 13, 2018

(54) MIGRATING SECRETS USING HARDWARE ROOTS OF TRUST FOR DEVICES

(71) Applicant: Microsoft Technology Licensing, LLC, Redmond, WA (US)

(72) Inventors: David R Wooten, Redmond, WA (US); Andrey Marochko, Redmond, WA (US); Dennis Mattoon, Kirkland, WA (US); Paul England, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 14/880,813

(22) Filed: Oct. 12, 2015

(65) Prior Publication Data

US 2017/0104580 A1   Apr. 13, 2017

(51) Int. Cl.
| | |
|---|---|
| *H04L 9/00* | (2006.01) |
| *G06F 9/445* | (2018.01) |
| *G06F 21/57* | (2013.01) |
| *G06F 21/71* | (2013.01) |
| *H04L 9/08* | (2006.01) |

(52) U.S. Cl.
CPC ............... *H04L 9/002* (2013.01); *G06F 8/65* (2013.01); *G06F 21/57* (2013.01); *G06F 21/575* (2013.01); *G06F 21/71* (2013.01); *H04L 9/0869* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2002/0013772 | A1* | 1/2002 | Peinado | G06F 21/10 705/51 |
| 2002/0172359 | A1* | 11/2002 | Saarinen | G06F 7/588 380/46 |

(Continued)

OTHER PUBLICATIONS

Menezes et al. (Alfred J. Menezes, Paul C. van Oorschot, Scott A. Vanstone, "Handbook of applied cryptography", 1997, ISBN: 0849385237).*

(Continued)

*Primary Examiner* — Peter Poltorak
(74) *Attorney, Agent, or Firm* — Drinker Biddle & Reath LLP

(57) ABSTRACT

Systems and methods facilitating a framework that provides a core trusted computing base (TCB) of an electronic device with various security capabilities. The framework can include a low-resource device and at least one distributed resource. The low-resource device can be configured to generate sealing keys, migration keys, and attestation keys that are based on a device secret associated with the low-resource device and one or more software modules. The low-resource device can further be configured to use the migration keys and the sealing keys to both verify a software update and migrate secrets from a previous version of the software to a newer version of the software. Additionally, the low-resource device can be configured to generate an attestation statement using the attestation keys and perform attestation using the attestation statement and the at least one distributed resource.

18 Claims, 17 Drawing Sheets

(56) References Cited

U.S. PATENT DOCUMENTS

| | | | |
|---|---|---|---|
| 2003/0200454 A1* | 10/2003 | Foster | G06F 21/575 726/17 |
| 2006/0265508 A1* | 11/2006 | Angel | H04L 29/12047 709/230 |
| 2007/0039042 A1 | 2/2007 | Apelbaum | |
| 2008/0077993 A1* | 3/2008 | Zimmer | G06F 9/5077 726/27 |
| 2009/0019547 A1 | 1/2009 | Palliyil et al. | |
| 2009/0154709 A1* | 6/2009 | Ellison | H04L 9/083 380/282 |
| 2009/0276617 A1* | 11/2009 | Grell | G06F 21/575 713/2 |
| 2010/0268936 A1* | 10/2010 | Matsushima | G06F 21/62 713/153 |
| 2012/0114123 A1 | 5/2012 | Morchon et al. | |
| 2014/0040873 A1* | 2/2014 | Goldman | G06F 8/65 717/168 |
| 2014/0082367 A1 | 3/2014 | Lambert et al. | |
| 2014/0089659 A1 | 3/2014 | Brickell et al. | |
| 2014/0115666 A1 | 4/2014 | Morchon et al. | |
| 2014/0298040 A1 | 10/2014 | Ignatchenko et al. | |
| 2014/0317417 A1 | 10/2014 | Ashkenazi | |
| 2015/0113518 A1 | 4/2015 | Liem et al. | |
| 2015/0121054 A1 | 4/2015 | Wu | |
| 2015/0261950 A1* | 9/2015 | Schulz | G06F 21/51 726/22 |
| 2015/0318986 A1* | 11/2015 | Novak | H04L 63/0428 713/189 |
| 2016/0232343 A1* | 8/2016 | Post | G06F 21/44 |

OTHER PUBLICATIONS

Anonymous: "Trusted Computing—Wikipedia", Sep. 12, 2015 (Sep. 12, 2015) XP055326770, Retrieved from the internet: URL:https://en.wikipedia.org/w/index.php?title=Trusted_Computing&oldid=680616942; retrieved on Jan. 5, 2017; 14 pages.

PCT Internation Search Report and Written Opinion for PCT/US2016/055110; dated Dec. 19, 2016, 25 pages.

PCT Internation Search Report and Written Opinion for PCT/US2016/055112; dated Jan. 20, 2017, 27 pages.

"International Preliminary Report on Patentability Issued in PCT Application No. PCT/US2016/055112", dated Jul. 20, 2017, 7 Pages.

Kuhn, et al., "Secure Data Management in Trusted Computing", In Proceedings of the 7th International Conference on Cryptographic Hardware and Embedded Systems, Aug. 29, 2005, 15 Pages.

* cited by examiner

MIGRATING SECRETS USING HARDWARE ROOTS OF TRUST FOR DEVICES

BACKGROUND

The Internet of Things (IoT) is a network of low-resource electronic devices embedded with software and connectivity that enables IoT devices to communicate with other electronic devices (e.g., other IoT devices and more traditional computing devices) via one or more networks. Due to communicating with other electronic devices using networks, these IoT devices are vulnerable to attacks by malware, which may disrupt computing operations and gather sensitive information from the IoT devices. As such, stronger security capabilities are needed in order protect the IoT devices from attacks. Implementing strong security can be difficult on IoT devices because of the limited resources that many IoT devices include.

SUMMARY

The techniques and constructs discussed herein facilitate a framework that provides a core trusted computing base (TCB) using a minimal set of hardware resources. The invention is particularly well suited to a low-resource electronic device (e.g., IoT device) with limited security capabilities, but has applicability in hardware containing re-configurable programs. The framework forms the foundation of the device's TCB and leverages a resource-constrained root of trust for measurement to provide all of the capabilities of a trusted platform. The capabilities include, but are not limited to, a root of trust for storage (e.g., providing the TCB components with secret sealing capabilities), and a root of trust for updates (e.g., ensuring that updated components of the device satisfy a current set of policies). Additionally, the framework can support having an external infrastructure that the device communicates with for performing secure remote attestation and/or updating components of the device in a secure manner. The framework can allow the device to communicate with the external infrastructure using secure communications that it protected from outside attacks.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
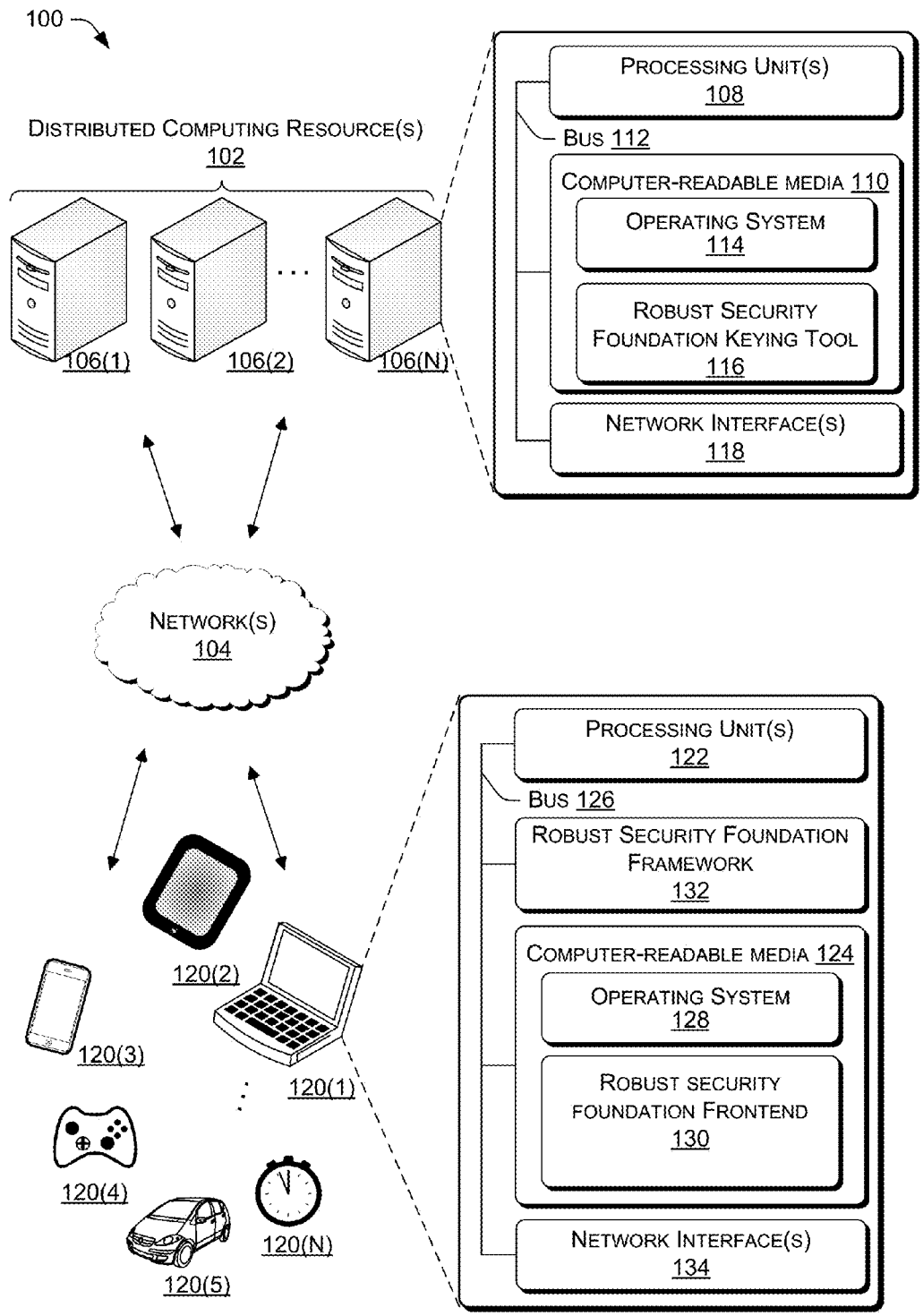
FIG. 1 is a block diagram depicting an example environment in which examples of resource-constrained, trusted devices may operate.

Examples described herein provide techniques and constructs for facilitating a framework that provides a core TCB of an electronic device with various hardware security capabilities. The framework works by both controlling the boot of the device's TCB and providing the TCB components with attestation and sealing capabilities, both of which can be rooted in device hardware while requiring very few hardware resources. The framework can also mediate the software update process for the device by implementing a protocol for protecting secrets of updated software modules. The protocol protects the secrets of the software modules by securely migrating the secrets from the previous versions of the software modules to the newer versions of the software modules in a secure manner. In some examples, a software module can include a component of the device's TCB that is either a single executable image or a group of executable images with identical trust properties.

The framework as described herein offers an improvement over previous techniques that establish a device's TCB using hardware based root of trust. For instance, previous techniques to establish a device's TCB, such as trusted platform module (TPM) and trusted execution environment (TEE) techniques, require a complex body of code, with the size in the range of hundreds of kilobytes. As such, devices that include limited memory storage, such as IoT devices, are incapable of storing the code for implementing these previous techniques. In contrast to previous techniques, the framework described herein can be implemented in under twenty kilobytes of code, which can make it suitable for network connected devices with extremely limited resources. Additionally, and based on how the framework implements the security measures, the framework can provide these devices with quicker booting capabilities.

Moreover, the framework offers the ability to recover compromised TCB (e.g., firmware TPM) without losing the identity of the device. The framework offers this improvement by representing the identity of the device using an attestation secret value that can be replaced. For instance, the attestation secret value can be replaced when compromised code is updated to a new version of software.

In order for a device to implement its roots of trust using the framework described herein, a vendor (and/or other entity) can program the device with a device secret. The device secret can include a statistically unique value that is unknown outside of the device after the vendor initially programs the device secret. In some examples, the vendor can program the device with the device secret by storing the device secret in a non-volatile, write-once memory on the device. For instance the vendor can program the device with the device secret by storing the device secret in the eFuses on the device. As such, in some examples, the device secret is only accessible during a power on event, and irreversibly disabled until the next power on event.

The device can use the device secret to generate a fuse-derived secret (FDS) value. The device can use the FDS value to derive all of the cryptographically unique secrets and values that the device uses during both a regular boot cycle and an update boot cycle of the device. In some examples, the device can generate the FDS value by hashing the concatenation of a hash of the device's immutable code to the device secret. The immutable code can include a policy checking code stored on the device that the device checks against a policy defined by the framework before the device runs any software module. For instance, the immutable code can include both physical ROM code and non-ROM framework code, the measurement of which can define the FDS. As such, in some examples, the immutable code is stored in the computer-readable media of the device. For instance, the device can store the immutable code in the ROM on the device. Additionally or alternatively, the device can store part of the immutable code in the ROM on the device and store another part of the immutable code in flash memory or other non-volatile (NV) memory on the device.

During a regular boot cycle, the device can perform a series of boot operations in order to validate the TCB boot chain on the device and to generate sealing keys for the software modules. Additionally, in some examples, the device can further generate attestation keys for the software modules. For instance, in order to validate the TCB boot chain, the device can run a verification protocol that determines whether one or more software modules in the boot chain meet a set of policy requirements. To run the verification protocol, the device can perform a privacy key derivation chain. The privacy key derivation chain can generate a sealing key for each of the software modules in the chain. The privacy key derivation chain can begin with the device generating a sealing seed using the device's FDS value. To generate the sealing seed, the device can hash the concatenation of device sealing constant to the FDS value. In some examples, the device sealing constant can include a private binary value that is only known by the device. In some examples, the device sealing constant can include a public binary value that is known outside of the device. The device can then use the sealing seed to generate the sealing keys for each of the software modules.

For instance, in order to generate the sealing keys, the device can perform a series of cryptographic functions, which include at least one cryptographic function for each software module in the boot chain. For example, to perform the cryptographic function for a first software module in the boot chain, the immutable code programs the device to access a software module descriptor (SMD) for the first software module, which defines the software module's identity. The device can store the SMD in the computer-readable media of the device, such as in the device's NV storage. The device (and/or the framework) can then execute a first key derivation function (KDF) to generate a first sealing key from a hash of the SMD of the first software module using the FDS value. The first sealing key can be specific to the first software module and thus, the first software module can use the first sealing key to both access and lock its secrets. For instance, in some examples, the first software module can use the first sealing key to generate one or more encryption keys. The first software module can then use the one or more encryption keys to encrypt/decrypt its secrets.

After the first software module encrypts its secrets, the device and/or the first software module determines whether to continue the boot chain sequence for the remaining software modules, which is described below. To continue the boot chain, the device and/or the first software module uses the first sealing key to generate a sealing key for the second software module using similar steps as those discussed above for the first software module. For instance, the immutable code can program the device to access a SMD for the second software module. The device can then execute a second KDF to generate the second sealing key from a hash of the SMD of the second software module using the first sealing key. The second software module can then use the second sealing key to generate one or more encryption keys and use them to lock its secrets. After locking the secrets for the second software module, the device and/or the framework can repeat the sealing key derivation procedure described above for the next software module in the boot chain.

The device continues to generate sealing keys for each of the remaining software modules in the boot chain using the above steps. When the boot chain is finished, the secrets for each of the software modules in the boot chain are locked and thus, protected from malicious code. Additionally, in order to ensure that the secrets remain locked, the device and/or the software modules can delete the sealing keys and/or the encryption keys. For instance, the device and/or the first software module can delete the first sealing key and encryption keys before passing control to the second software module. This ensures that the secrets of the first software module are safe even if another software module in the boot chain is compromised.

During the regular boot cycle of the device, the device can further perform a similar series of steps in order to generate attestation keys, which the device uses for attestation. To generate the attestation keys, the device can obtain an encrypted attestation seed from an update authority, which the device can store in the computer-readable media of the device (e.g., NV memory). The device can then recover an attestation seed by decrypting the encrypted attestation seed using the device's internal protector key, which the device can also generate using the FDS value. For instance, the device can generate the internal protector key by hashing the concatenation of a device privacy constant to the FDS value. The device privacy constant can include a unique binary value that is specific to the device. As such, like the FDS value of the device, the internal protector key is also specific to the device.

After decrypting the encrypted attestation seed using the internal protector key, the device can generate an attestation key chain by morphing an attestation key for each software module. For instance, similar to generating the sealing keys described above, the device can execute a respective KDF for each software module in order to generate an attestation key for the respective software module from the SMD of the respective software module using the attestation key of the previous software module. At the end of the boot chain, the device can use the last attestation key (i.e., the attestation secret) to perform attestation or enroll attestation identity key. For instance, the device can use the attestation secret to sign an attestation statement that includes a device public key or the attestation secret encrypted to device public key. The attestation statement can be sent to an attestation authority. The attestation authority can then verify the signature on the attestation statement, and thus, indirectly, verify the validity of software modules booted by device, as the device can recover valid signing key if and only if all its software modules are valid (not compromised).

In some examples, the update attestation authority can generate a key pair called an attestation identity key along with the attestation seed for the device. The update authority can then certify the key pair with the attestation authority and receive an attestation certificate based on the certification of the key pair. The update authority can then encrypt the attestation identity key and the attestation certificate using a generated attestation secret, which the update authority can generate using similar steps as the device described above. After encrypting the attestation identity key and the attestation certificate, the update authority can send the encrypted attestation identity key and attestation certificate to the device and the device can use the encrypted attestation identity key and attestation certificate to verify the software update.

For instance, the device can decrypt the encrypted attestation identity key and attestation certificate after generating the attestation secret. In some examples, the device can then re-encrypt attestation identity key using the sealing key of the last software module (the one that produced the attestation secret). The device can then attest to the software update using the attestation identity key and attestation certificate. For example, only the device that includes the correct device public identity can generate the attestation secret that can decrypt the encrypted attestation identity key and attestation certification. The device can then store the attestation certificate in the device's computer-readable media (e.g., NV memory) and use the attestation certificate to perform attestation. In some examples, the device first encrypts the attestation certificate using a sealing key before storing the attestation certificate in the computer-readable media.

It should be noted that the device can receive the attestation seed and/or encrypted attestation identity key and attestation certificate from the update authority after the device updates the software modules using the update authority. In some examples, when the device implements asymmetric cryptography, the update authority can encrypt the attestation seed to the device public key and send the attestation seed encrypted to the device public key to the device. The device can then decrypt the attestation seed encrypted to the device public key using a device private key. In some examples, the device can then re-encrypt the attestation seed using the internal protector key, and store the encrypted attestation seed in the computer-readable media. In some examples, when the device includes a symmetric device, the update authority can encrypt the attestation seed to the internal protector key and send the encrypted attestation seed to the device. The device can then store the encrypted attestation seed in the computer-storage media of the device. Still, in some examples, when the device receives the encrypted attestation identity key and attestation certificate, the device can delete the attestation seed after decrypting the attestation identity key and attestation certificate.

In order to validate the boot sequence of the software modules, the device can performs integrity checks for each of the software modules using the sealing keys and/or the attestation keys. For instance, the device can protect the integrity of a software module using a hash-based message authentication code (HMAC) signature on the software module's SMD. The device can check a HMAC signature of a software module using the sealing key and/or attestation key of the preceding software module in the boot chain. If the HMAC signature on the SMD of a software module is correct, the software module is validated and the boot sequence of the software modules continues as discussed above. However, if the HMAC signature on the SMD of the software module is incorrect, the device or the software module can stop the boot sequence. The device can then perform a remediation process to return the device's TCB to a trustworthy state.

In some examples, the HMAC signatures on the software modules' SMDs can be specific to the device. For instance, after the device updates a software module, the device can verify the software module by checking a signature on the software module's SMD. In some examples, the signature includes an elliptic curve cryptography signature. After verifying the software module, the device can then sign the software module using a device specific signature key (HMAC signature). The device can then check the device specific HMAC signature on each of the software modules using the sealing key and/or attestation key during the boot chain using a similar method described above.

In addition to validating the TCB boot chain on the device, the device can further use the framework to perform a secure update boot sequence, which the framework uses to ensure that updated software modules on the device satisfy a current set of policies. For instance, a device can download one or more software module updates from an update authority, which can include updates to the TCB components of the device. After downloading the software module updates, the device can perform a secure update boot sequence to ensure that the device did not download any unauthorized software (e.g., malicious code) during the update process. In some examples, the device can perform the secure update boot sequence during the next boot process of the device after updating the software modules.

To perform the secure boot sequence, the device generates sealing keys and attestation keys based on the updated software modules. For instance, and similar to the method described above for generating sealing keys and attestation keys, the device can generate updated sealing keys and updated attestation keys using the SMDs of the updated versions of the software modules. The device can then use the new sealing keys and/or the new attestation keys to verify the updated versions of the software modules.

After updating one or more software modules on the device, the device can further use migration keys and new sealing keys to migrate secrets from the previous versions of the one or more software modules to the new version of the one or more software modules. For instance, after the device receives am update to one or more software modules, the device can generate migration keys and new sealing keys for the one or more updated software modules. The device can generate migration keys using the SMDs of the previous versions of the software modules, which are similar to the sealing keys the device generates during the regular boot sequence described above, and generate the new sealing keys using the SMDs of the new version of the software modules. The device can then access the secrets from the previous versions of the software modules using the migration keys and then re-seal the secrets in the new versions of the software modules using the new sealing keys. In this way, the device is able to pass the secrets of the software modules from the previous versions of the software modules to the new versions of the software modules each time the device performs a software update on the software modules.

Additionally, a third-party device and/or service can verify the device using attestation. In some examples, to verify the device, the device can send the third-party a signed attestation statement (generated using the attestation secret) along with the attestation certificate issued by the attestation authority and the third-party can use the signed attestation statement and attestation certificate to verify the device. In some examples, the device can send the attestation statement along with the device public key to the third-party. The third-party can then send the attestation statement and device public key to the attestation authority for verification.

Various examples, scenarios, and aspects are described further with reference to FIGS. 1-17.

Illustrative Environment

FIG. 1 shows an example environment 100 in which hardware roots of trust for devices can operate. In some examples, the various devices and/or components of environment 100 include distributed computing resource(s) 102 that can communicate with one another and with external devices via one or more network(s) 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). For instance, support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, thin clients, terminals, work stations, integrated components for inclusion in a computing device, or any other sort of computing device.

Device(s) 106 can include any type of computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, a robust security foundation keying tool 116, and other modules, programs, or applications that are loadable and executable by processing units(s) 108. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Device(s) 106 can also include one or more network interface(s) 118 to enable communications between computing device(s) 106 and other networked devices, such as client computing device(s) 120 involved in the hardware roots of trust for low-resource devices, or other devices over network(s) 104. Such network interface(s) 118 can include one or more network interface controllers (NICs) or other types of transceiver devices to send and receive communications over a network. For simplicity, other components are omitted from the illustrated device(s) 106.

Other devices involved in hardware roots of trust for devices can include client computing devices 120(1)-120(N). Device(s) 120 can belong to a variety of categories or classes of devices such as traditional client-type devices, desktop computer-type devices, mobile devices, special purpose-type devices, embedded-type devices, Internet of Things (IoT) devices, and/or wearable-type devices. By way of example and not limitation, computing device(s) 120 can include, but are not limited to, server computers or blade servers such as Web servers, map/reduce servers or other computation engines, or network-attached-storage units, laptop computers, thin clients, terminals, or other mobile computers (e.g., 120(1)), computer navigation client computing devices, satellite-based navigation system devices including global positioning system (GPS) devices and other satellite-based navigation system devices, personal data assistants (PDAs), and other specialized portable electronic devices, tablet computers or tablet hybrid computers (e.g., 120(2)), smartphones, mobile phones, mobile phone-tablet hybrid devices, or other telecommunication devices (e.g., 120(3)), portable or console-based gaming devices or other entertainment devices such as network-enabled televisions, set-top boxes, media players, cameras, or personal video recorders (PVRs) (e.g., 120(4), represented graphically as a gamepad), automotive computers such as vehicle control systems, vehicle security systems, or electronic keys for vehicles (e.g., 120(5), represented graphically as an automobile), wearable computers such as smart watches or biometric or medical sensors, implanted computing devices such as biometric or medical sensors, or fixed sensors, such as IoT sensors, configured to monitor time, environmental conditions, vibration, motion, or other attributes of the world or structures or devices therein, e.g., bridges or dams (e.g., 120(N), represented graphically as a clock) desktop computers, or integrated components for inclusion in computing devices, appliances, or other computing device(s).

Client computing device(s) 120 can represent any type of computing device having one or more processing unit(s) 122 operably connected to computer-readable media 124 such as via a bus 126, which in some instances can include one or more of a system bus, a data bus, an address bus, a PCI bus, a Mini-PCI bus, and any variety of local, peripheral, and/or independent buses.

Executable instructions stored on computer-readable media 124 can include, for example, an operating system 128, a robust security foundation framework 130, and other modules, programs, or applications that are loadable and executable by processing units(s) 122. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

In some examples, computer-readable media 124 and operating system 128 can be specially designed for low-resource and/or extremely low-resource devices. For instance, computing devices 102(5), which can include automotive computers such as vehicle control systems, vehicle security systems, or electronic keys for vehicles, and computing devices 105(N), which can include an IoT device, can include low-resource devices with limited hardware capabilities. In some examples, for such low-resource devices, operating system 128 can include an operating system that only requires 116-1,024 megabytes of internal memory and 4-160 kilobytes of static RAM memory to operate. In some examples, operating system 128 can include an operating system that requires more or less memory to operate.

Device(s) 120 can also include a robust security foundation framework 132, which device(s) 120 can use to perform some of and/or all of the security operations described herein. For instance, device(s) 120 can use robust security foundation framework 132 to perform both attestation and sealing of secrets. Additionally, device(s) 120 can use robust security foundation framework 132 to mediate software update processes by verifying validity of update software modules and implementing protocols for secrets migration from older versions of software components to newer version of software components.

Device(s) 120 can also include one or more network interface(s) 134 to enable communications between device(s) 120 and other networked devices such as other device(s) 120 or device(s) 106 over network(s) 104. Such network interface(s) 134 can include one or more network interface controllers (NICs) or other types of transceiver devices to send and receive communications over a network.

Figure 2:
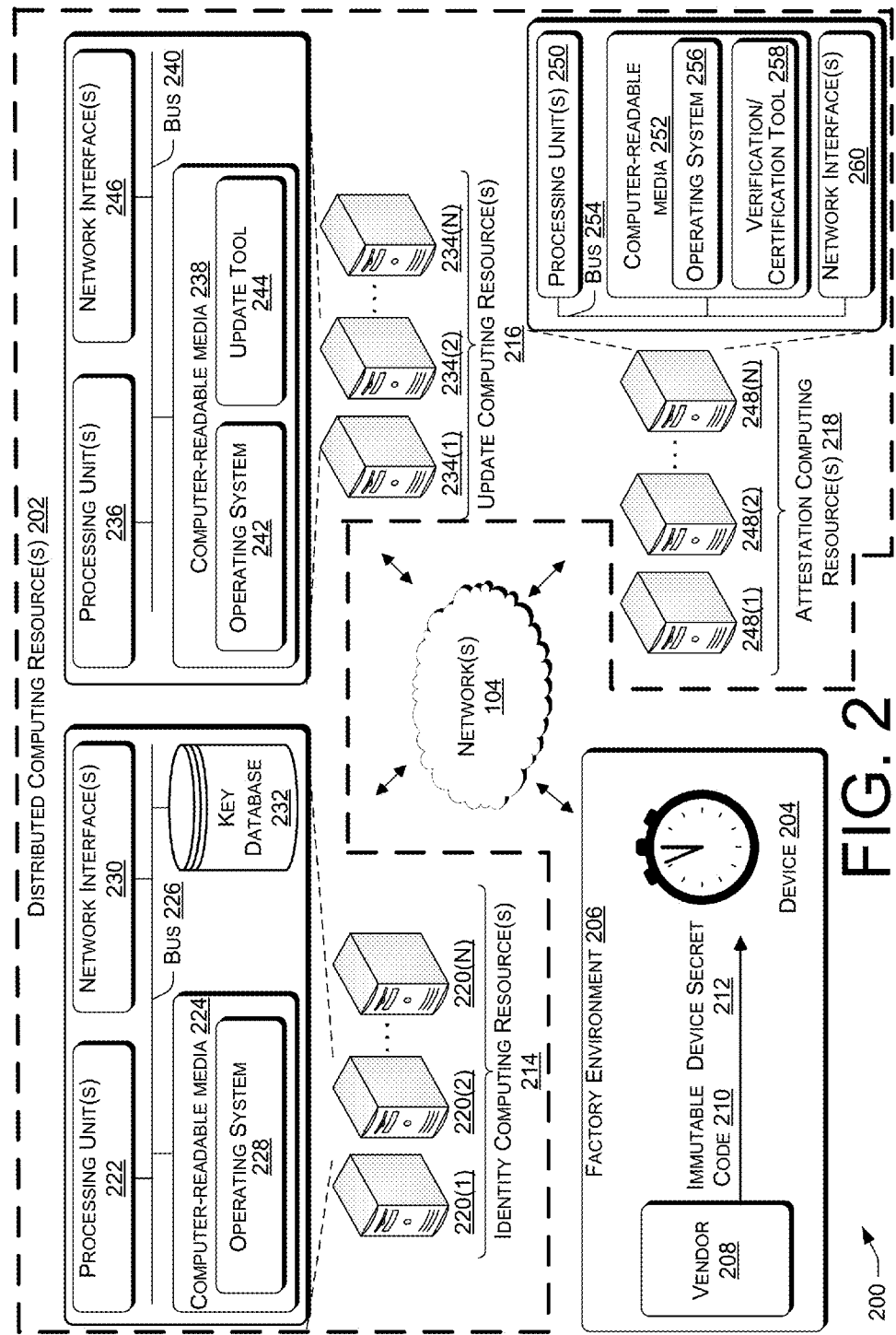
FIG. 2 is a block diagram depicting an example environment in which distributed computing resources communicate with a device to implement a robust security foundation keying architecture.

FIG. 2 is a block diagram depicting an example environment 200 in which distributed computing resource(s) 202 communicate with a device 204 to implement a robust security foundation framework. In some examples, distributed computing resource(s) 202 communicating with device 204 can respectively represent distributed computing resource(s) 102 communicating with one of device(s) 120 from FIG. 1. In the example environment 200 of FIG. 2, the resources illustrated in environment 200 can represent the framework that provides device 204 with a robust security foundation keying architecture.

As illustrated in FIG. 2, factory environment 206 includes device vendor 208 providing device 204 with both immutable code 210 and a device secret 212. Device vendor 208 can include an entity that establishes an identity for device 204 by installing at least one of immutable code 210 and device secret 212 on device 204. For instance, device vendor 208 can include the manufacturer of device 204 and/or a manufacturer of one or more parts (e.g., hardware or software) of device 204. Immutable code 210 can include one or more of physical ROM code or non-ROM framework code on device 204. Device secret 212 can include a statistically unique value that is unknown outside of device 204 after device vendor 208 initially programs device 204 with device secret 212. For instance, device secret 212 can include hardware secrets that device vendor 208 programs on device 204, such as by blowing eFuses on device 204.

Also illustrated in the example environment 200 of FIG. 2, distributed computing resource(s) 202, which can represent distributed computing resource(s) 102 from FIG. 1, can include identity computing resource(s) 214, update computing resource(s) 216, and attestation computing resource(s) 218. Distributed computing resource(s) 202 can include the external infrastructure that complements robust security foundation framework installed on device 204. Even though the distributed computing resource(s) 202 are illustrated as three separate computing resource(s) 214, 216, and 218, in some examples, two or more of the distributed computing resource(s) 202 can be combined into a single computing resource, and/or one or more of the distributed computing resource(s) 202 can be separated into additional computing resources, which perform the operations described herein.

In various examples, identity computing resource(s) 214 can include devices 220(1)-220(N), which can represent one or more device(s) 106(1)-106(N) from FIG. 1. Device(s) 220 can include any type of computing device having one or more processing unit(s) 222 operably connected to computer-readable media 224 such as via a bus 226. Executable instructions stored on computer-readable media 224 can include, for example, an operating system 228, and other modules, programs, or applications that are loadable and executable by processing units(s) 222. Alternatively, or in addition, the functionality described herein can be performed, at least in part, by one or more hardware logic components such as accelerators.

Device(s) 220 can also include one or more network interface(s) 230 to enable communications between computing device(s) 220 and other networked devices, such as low-resource device 204, update computing resource(s) 216, attestation computing resource(s) 218, or other devices over network(s) 104. For simplicity, other components are omitted from the illustrated device(s) 220.

Identity computing resource(s) 214 can include a service (e.g., authority) that receives device public keys from device vendor 208. In some examples, identity computing resource(s) 214 can further receive internal protector keys from device vendor 208. Identity computing resource(s) 214 can then store the keys in key database 232. In some examples, key database 232 can include a data storage such as a database, data warehouse, or other type of structured or unstructured data storage that stores private and public keys for devices, such as device 204. Identity computing resource(s) 214 can then retrieve one or more keys from key database 232 and provide the one or more keys to other computing resource(s), such as update computing resource(s) 216, upon receiving requests for the one or more keys.

Additionally, identity computing resource(s) 214 can verify the identity of a device 204 using one or more keys from key database 232 upon receiving a request. For instance, identity computing resource(s) 214 can receive a request to verify device 204 from update computing resource(s) 216. In response, identity computing resource(s) 214 can search for the device public key and/or the internal protector key associated with device 204 in key database 232. Identity computing resource(s) 214 can then send update computing resource(s) 216 a communication that indicates that identity computing resource(s) 214 either verified device 204 or could not verify device 204.

In various examples, update computing resource(s) 216 can include devices 234(1)-234(N), which can represent one or more device(s) 106(1)-106(N) from FIG. 1. Device(s) 234 can include any type of computing device having one or more processing unit(s) 236 operably connected to computer-readable media 238 such as via a bus 240. Executable instructions stored on computer-readable media 238 can include, for example, an operating system 242, an update tool 244, and other modules, programs, or applications that are loadable and executable by processing units(s) 236. Alternatively, or in addition, the functionality described herein can be performed, at least in part, by one or more hardware logic components such as accelerators.

Device(s) 234 can also include one or more network interface(s) 246 to enable communications between computing device(s) 234 and other networked devices, such as device 204, identity computing resource(s) 214, attestation computing resource(s) 218, or other devices over network(s) 104. For simplicity, other components are omitted from the illustrated device(s) 234.

Update computing resource(s) 216 can include a service (e.g., authority) that provides device 204 with software updates. For instance, update computing resource(s) 216 can utilize update tool 244 to provide device 204 with updates for software modules stored on device 204, such as TCB components of device 204. Update computing resource(s) 216 can further utilize update tool 244 to provide device 204 with one or more of attestation seeds, attestation identity keys, and/or attestation certificates, which is described below. Additionally, update computing resource(s) 216 can utilize update tool 244 to generate an attestation secret that is associated with device 204. After generating the attestation secret, update computing resource(s) 216 can provide the attestation secret to attestation computing resource(s) 218 so that attestation computing resource(s) 218 can verify attestation statements and/or generate attestation certificates for device 204.

In various examples, attestation computing resource(s) 218 can include devices 248(1)-248(N), which can represent one or more device(s) 106(1)-106(N) from FIG. 1. Device(s) 248 can include any type of computing device having one or more processing unit(s) 250 operably connected to computer-readable media 252 such as via a bus 254. Executable instructions stored on computer-readable media 252 can include, for example, an operating system 256, a verification/certification tool 258, and other modules, programs, or applications that are loadable and executable by processing units(s) 250. Alternatively, or in addition, the functionality described herein can be performed, at least in part, by one or more hardware logic components such as accelerators.

Device(s) 248 can also include one or more network interface(s) 260 to enable communications between computing device(s) 248 and other networked devices, such as device 204, identity computing resource(s) 214, update computing resource(s) 216, or other devices over network(s) 104. For simplicity, other components are omitted from the illustrated device(s) 248.

Attestation computing resource(s) 218 can include a service (e.g., authority) that verifies attestation statements generated by devices, such as device 204. To be able to verify attestation statements, attestation computing resource(s) 218 can receive an attestation secret from update computing resource(s) 216. Attestation computing resource(s) 218 can further receive an attestation statement generated by device 204 from a third-party entity requesting attestation verification (attestation requestor), such as a third-party device and/or third-party service. Attestation computing resource(s) 218 can then utilize verification/certification tool 258 to verify the attestation statement using the attestation secret. If attestation computing resource(s) 218 verifies the attestation statement, attestation computing resource(s) 218 can then send the attestation requestor (e.g., the third-party) a communication (e.g., message) indicating that the attestation statement is verified. However, if attestation computing resource(s) 218 cannot verify the attestation statement, attestation computing resource(s) 218 can then send attestation requestor a communication (e.g., message) indicating that the attestation statement could not be verified.

In some examples, attestation computing resource(s) 218 can further generate attestation certificates for devices, such as device 204. For instance, attestation computing resource(s) 218 can receive a key pair (attestation identity key) from update computing resource(s) 216. Attestation computing resource(s) 218 can then certify the key pair and issue an attestation certificate to update computing resource(s) 216. Update computing resource(s) 216 can then provide the attestation certificate to device 204 so that device 204 can perform attestation.

Figure 3:
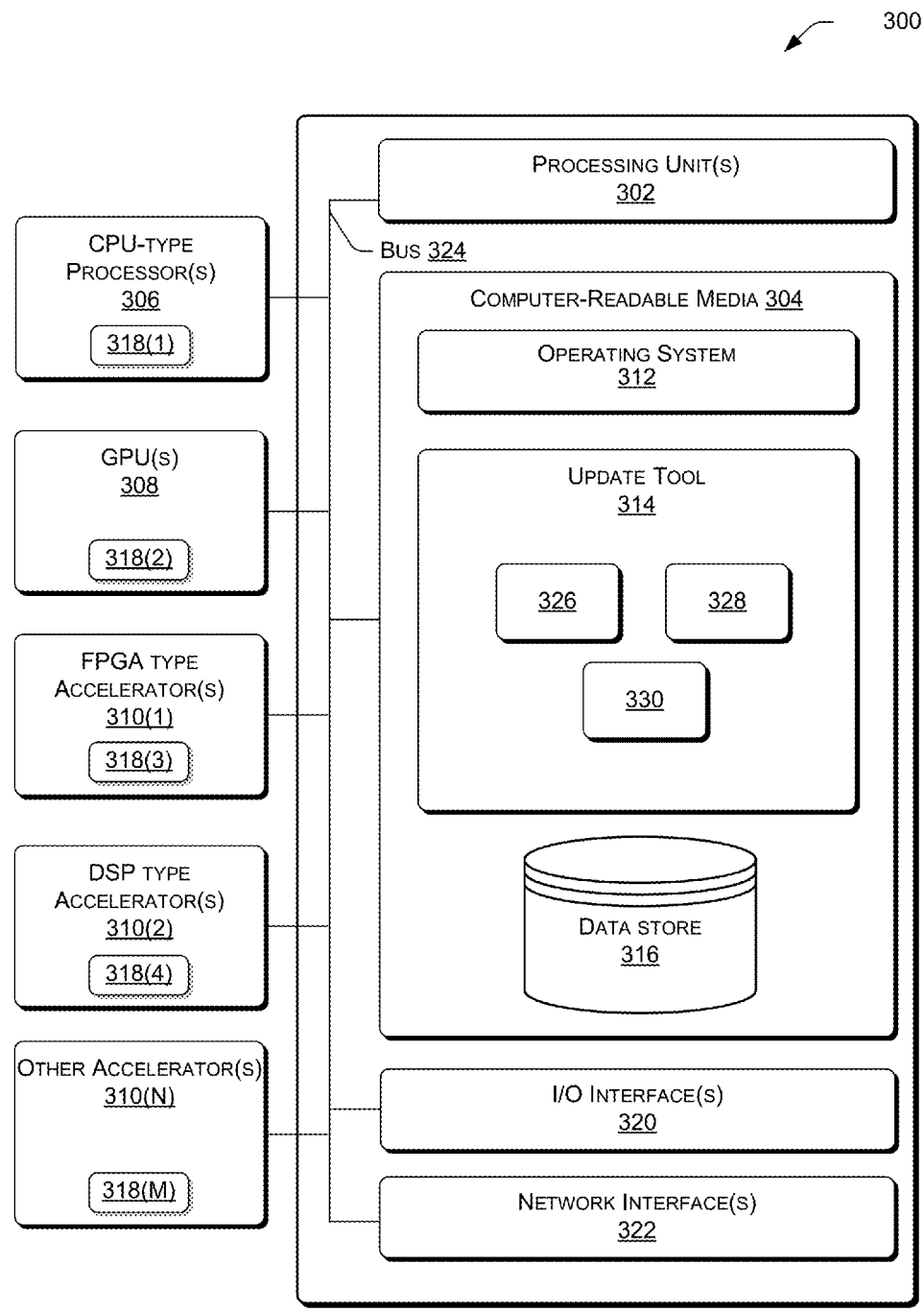
FIG. 3 is a block diagram depicting an example updating computing device of the updating computing resource(s) of FIG. 2.

FIG. 3 is a block diagram depicting an example updating computing device 300 of updating computing resource(s) 216, such as a device 234 from FIG. 2. In device 300, processing unit(s) 302 can include processing unit(s) 236, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In the illustrated example, computer-readable media 304 can represent computer-readable media 238 and can store instructions executable by processing unit(s) 302. Computer-readable media 304 can also store instructions executable by an external CPU-type processor 306, executable by a GPU 308, and/or executable by an accelerator 310, such as an FPGA type accelerator 310(1), a DSP type accelerator 310(2), or any internal or external accelerator 310(N). In various examples at least one GPU 308 and/or accelerator 310 is incorporated in device 300, while in some examples one or more of GPU 308 and/or accelerators 310 are external to device 300, as illustrated in FIG. 3. Executable instructions stored on computer-readable media 304 can include, for example, an operating system 312, update tool 314 (such as update tool 244 from FIG. 2), and other modules, programs, or applications that are loadable and executable by processing units(s) 302, 306, 308 and/or 310.

In the illustrated embodiment, computer-readable media 304 also includes a data store 316. In some examples, data store 316 can include data storage such as a database, data warehouse, or other type of structured or unstructured data storage. In some examples, data store 316 can include a relational database with one or more tables, indices, stored procedures, and so forth to enable data access. Data store 316 can store data for the operations of processes, applications, components, and/or modules stored in computer-readable media 304 and/or executed by processor(s) 302, 306, and/or 308, and/or accelerator(s) 310. Furthermore, data store 316 can store data that is used to update software on low-resource devices. For example, data store 316 can store software modules that device 300 provides to devices when the devices are updating software using device 300, such as when devices are updating TCB components. Alternately, some or all of the above-referenced data can be stored on separate memories 318, such as a memory 318(1) on board a CPU type processor 306, memory 318(2) on board a GPU 308, memory 318(3) on board an FPGA type accelerator 310(1), memory 318(4) on board a DSP type accelerator 310(2), and/or memory 318(M) on board another accelerator 310(N).

Device 300 can further include one or more input/output (I/O) interface(s) 320 to allow device 300 to communicate with input/output devices such as user input devices including peripheral input devices (e.g., a keyboard, a mouse, a voice input device, a touch input device, a gestural input device, and the like) and/or output devices including peripheral output devices (e.g., a display, a printer, audio speakers, and the like). Device 300 can also include one or more network interface(s) 322, such as network interface(s) 246 of FIG. 2 and/or network interface(s) 118 of FIG. 1, to enable communications between device 300 and other networked devices.

Bus 324, which can include bus 240, can include one or more of a system bus, a data bus, an address bus, a PCI bus, a Mini-PCI bus, and any variety of local, peripheral, and/or independent buses, can operably connect computer-readable media 304 to processing unit(s) 302.

In the illustrated example, update tool 314, which can include update tool 244 from FIG. 2, can include one or more modules and/or APIs, which are illustrated as blocks 326, 328, and 330, although this is just an example, and the number can vary higher or lower. Functionality described associated with blocks 326, 328, and 330 can be combined to be performed by a fewer number of modules and/or APIs or it can be split and performed by a larger number of modules and/or APIs.

For example, block 326 can represent an updating module with logic to program processing unit(s) 302 of device 300 for performing the software updating operations described herein by device 300. For example, updating module 326 can send a communication to a network device, such as device 204 of FIG. 2 and/or device(s) 120 of FIG. 1, which notifies the network device that one or more software updates are available. The communication can include metadata that describes the software updates. For instance, the metadata can include data that represents a software modules descriptor (SMD) for one or more software modules to be updated and a version for the one or more software module updates. Updating module 326 can then receive an authorization from the network device and, based on the authorization, cause the execution of the software update by the network device.

Block 328 can represent an attestation module with logic to program processing unit(s) 302 of device 300 for generating attestation seeds, attestation secrets and/or key pairs (attestation identity keys). For example, attestation module 328 can generate one or more attestation seeds for the network device described above. Additionally, attestation module 328 can generate one or more attestation secretes that correspond to the one or more attestation seeds. Attestation module 328 can generate the one or more attestation seeds and/or the key pair in response to the network device updating one or more software modules using device 300. Attestation module 328 can then cause device 300 to send the one or more attestation seeds to the network device, and send the one or more attestation secrets and/or the key pair to an attestation computing resource, such as attestation computing resource(s) 218 from FIG. 2.

For instance, in some examples, attestation module 328 does not generate a key pair for a device. In such examples, attestation module 328 can cause the one or more attestation secrets to be sent to attestation computing resource(s) 218 so that attestation computing resource(s) 218 to perform attestation for a device. In other examples, attestation module 328 generates the key pair for the device. In such examples, attestation module 328 can cause the key pair to be sent to attestation computing resource(s) 218 so that attestation computing resource(s) 218 can verify the key pair and send updating computing device 300 an attestation certification in response.

Block 330 can represent an encryption/decryption module with logic to program processing unit(s) 302 of device 300 for performing encryption and decryption. For example, encryption/decryption module 330 can encrypt attestation seeds and attestation statements before attestation module 328 causes device 300 to send attestation seeds and attestation secrets to network devices and attestation computing resources, respectively. In some examples, encryption/decryption module 330 can encrypt attestation seeds and/or attestation secrets using a device public key of a network device. In some examples, encryption/decryption module 330 can encrypt attestation seeds and/or attestation secrets using an internal protector key of the network device. In some examples, encryption/decryption module 330 can encrypt attestation certificates and attestation identity keys before sending the attestation certificates to the network devices. When encrypting an attestation certificate and attestation identity key, encryption/decryption module 330 can encrypt the attestation certificate attestation identity key using the generated attestation secret generated using an attestation seed associated with a network device. Additionally, in some examples, device 300 can include a hardware component that performs some and/or all of the operations of encryption/decryption module 330.

Figure 4:
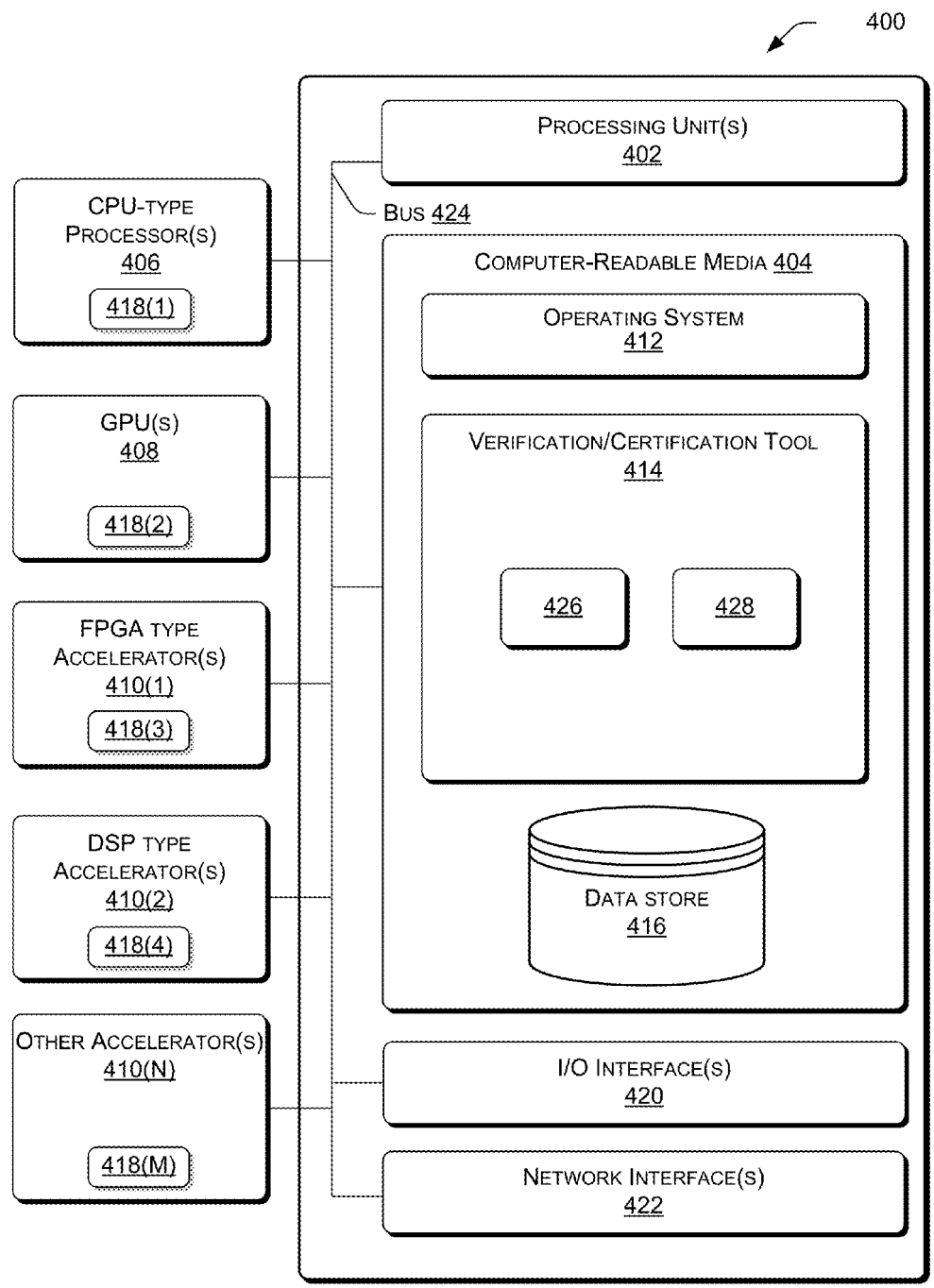
FIG. 4 is a block diagram depicting an example attestation computing device of the attestation computing resource(s) of FIG. 2.

FIG. 4 is a block diagram depicting an example attestation computing device 400 of attestation computing resource(s) 218, such as a device 248 from FIG. 2. In device 400, processing unit(s) 402 can include processing unit(s) 250, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In the illustrated example, computer-readable media 404 can represent computer-readable media 252 and can store instructions executable by processing unit(s) 402. Computer-readable media 404 can also store instructions executable by an external CPU-type processor 406, executable by a GPU 408, and/or executable by an accelerator 410, such as an FPGA type accelerator 410(1), a DSP type accelerator 410(2), or any internal or external accelerator 410(N). In various examples at least one GPU 408 and/or accelerator 410 is incorporated in device 400, while in some examples one or more of GPU 408 and/or accelerators 410 are external to device 400, as illustrated in FIG. 4. Executable instructions stored on computer-readable media 404 can include, for example, an operating system 412, verification/certification tool 414 (such as verification/certification tool 258 from FIG. 2), and other modules, programs, or applications that are loadable and executable by processing units(s) 402, 406, 408 and/or 410.

In the illustrated embodiment, computer-readable media 404 also includes a data store 416. In some examples, data store 416 can include data storage such as a database, data warehouse, or other type of structured or unstructured data storage. In some examples, data store 416 can include a relational database with one or more tables, indices, stored procedures, and so forth to enable data access. Data store 416 can store data for the operations of processes, applications, components, and/or modules stored in computer-readable media 404 and/or executed by processor(s) 402, 406, and/or 408, and/or accelerator(s) 410. Alternately, some or all of the above-referenced data can be stored on separate memories 418, such as a memory 418(1) on board a CPU type processor 406, memory 418(2) on board a GPU 408, memory 418(3) on board an FPGA type accelerator 410(1), memory 418(4) on board a DSP type accelerator 410(2), and/or memory 418(M) on board another accelerator 410(N).

Device 400 can further include one or more input/output (I/O) interface(s) 420 to allow device 400 to communicate with input/output devices such as user input devices including peripheral input devices (e.g., a keyboard, a mouse, a voice input device, a touch input device, a gestural input device, and the like) and/or output devices including peripheral output devices (e.g., a display, a printer, audio speakers, and the like). Device 400 can also include one or more network interface(s) 422 to enable communications between device 400 and other networked devices, such as network interface(s) 260 of FIG. 2 and/or network interface(s) 118 of FIG. 1.

Bus 424, which can include bus 254, can include one or more of a system bus, a data bus, an address bus, a PCI bus, a Mini-PCI bus, and any variety of local, peripheral, and/or independent buses, can operably connect computer-readable media 404 to processing unit(s) 402.

In the illustrated example, verification/certification tool 414 can include one or more modules and/or APIs, which are illustrated as blocks 426 and 428, although this is just an example, and the number can vary higher or lower. Functionality described associated with blocks 426 and 428 can be combined to be performed by a fewer number of modules and/or APIs or it can be split and performed by a larger number of modules and/or APIs.

Block 426 can represent an attestation module with logic to program processing unit(s) 402 of device 400 for performing the attestation operations described herein for device 400. In some examples, attestation module 426 can verify a network device using the attestation statement generated by the network device that device 400 receives from a third-party entity and the attestation secret that device 400 receives from update computing resource(s) 216. In some examples, verifying the network device can include comparing the attestation statement to the attestation secret. While comparing, if the attestation statement matches the attestation secret, such that they include the same value, then attestation module 426 can verify the network device for the third-party entity. However, if the attestation statement does not match the attestation secret, such that they do not include the same value, then attestation module 426 cannot verify network device for the third-party entity. In either instance, device 400 sends the third-party entity a communication indicating whether or not the device could be verified by attestation module 426.

In some examples, attestation module 426 can verify a key pair associated with a network device that device 400 receives from update computing resource(s) 216. After verifying the key pair, attestation module 426 can generate an attestation certification associated with the network device and send the attestation certificate to update computing resource(s) 216. The network device can then use the attestation certificate (that the network device receives from update computing resource(s) 216) to perform attestation, which is described below.

Block 428 can represent a notification module with logic to program processing unit(s) 402 of device 400 for performing the notification operations described herein after device 400 performs attestation. For instance, notification module 428 can generate a communication in response to attestation module 426 verifying or not verifying an attestation statement. If an attestation statement is verified, then the communication can include an indication that the attestation statement is verified. However, if the attestation statement cannot be verified, then the communication can include an indication that the attestation statement cannot be verified. In some examples, after generating the communication, device 400 sends the communication to the third-party entity requesting attestation.

Figure 5:
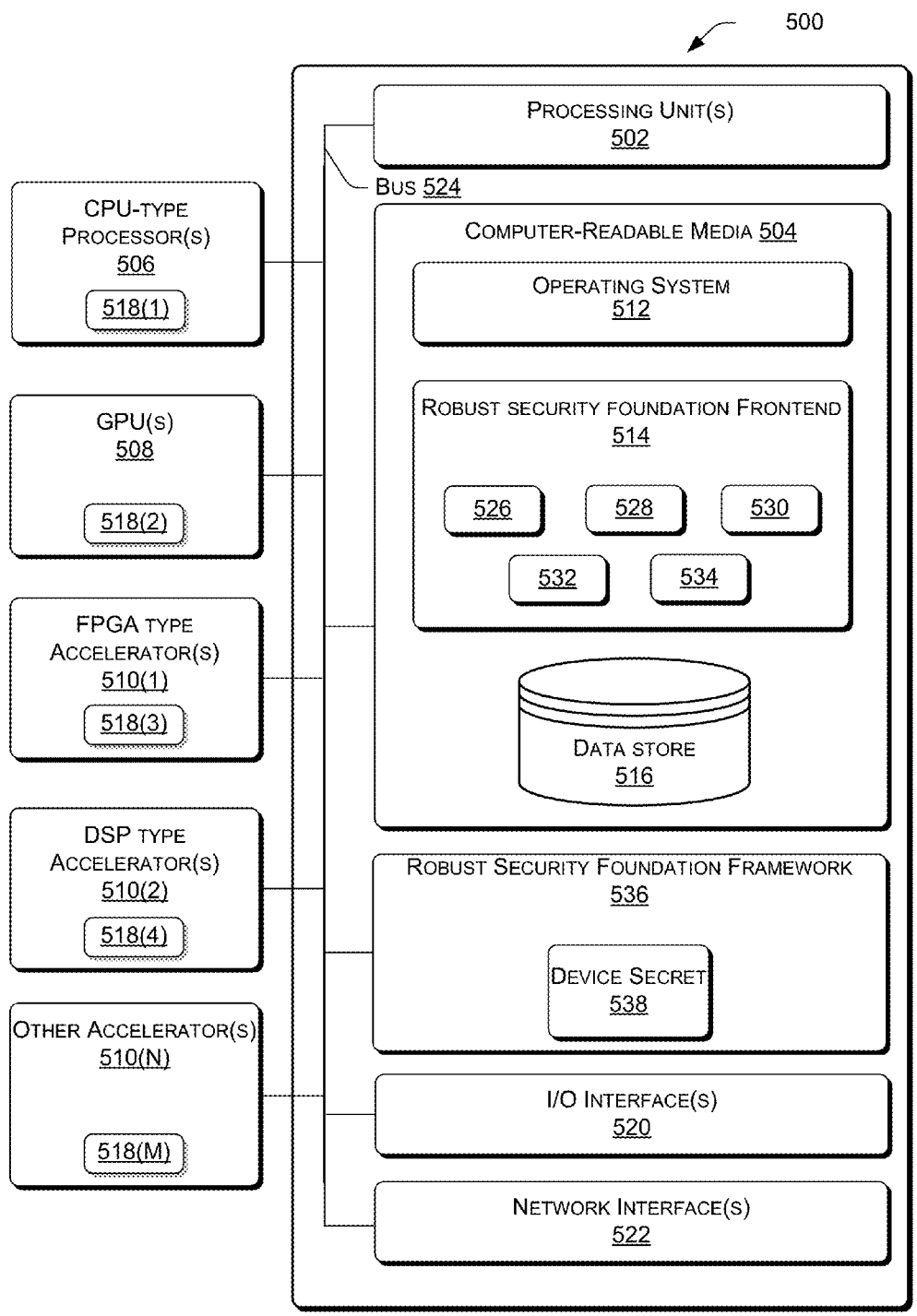
FIG. 5 is a block diagram depicting an example computing device.

FIG. 5 is a block diagram depicting an example device 500, such as device 204 from FIG. 2 or one of device(s) 120 from FIG. 1. In device 500, processing unit(s) 502 can include processing unit(s) 122, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In the illustrated example, computer-readable media 504 can represent computer-readable media 124 and can store instructions executable by processing unit(s) 502. Computer-readable media 504 can also store instructions executable by an external CPU-type processor 506, executable by a GPU 508, and/or executable by an accelerator 510, such as an FPGA type accelerator 510(1), a DSP type accelerator 510(2), or any internal or external accelerator 510(N). In various examples at least one GPU 508 and/or accelerator 510 is incorporated in device 500, while in some examples one or more of GPU 508 and/or accelerators 510 are external to device 500, as illustrated in FIG. 5. Executable instructions stored on computer-readable media 504 can include, for example, an operating system 512, robust security foundation frontend 514 (such as robust security foundation frontend 130 from FIG. 1), and other modules, programs, or applications that are loadable and executable by processing units(s) 502, 506, 508 and/or 510.

In the illustrated embodiment, computer-readable media 504 also includes a data store 516. In some examples, data store 516 can include data storage such as a database, data warehouse, or other type of structured or unstructured data storage. In some examples, data store 516 can include a relational database with one or more tables, indices, stored procedures, and so forth to enable data access. Data store 516 can store data for the operations of processes, applications, components, and/or modules stored in computer-readable media 504 and/or executed by processor(s) 502, 506, and/or 508, and/or accelerator(s) 510. Alternately, some or all of the above-referenced data can be stored on separate memories 518, such as a memory 518(1) on board a CPU type processor 506, memory 518(2) on board a GPU 508, memory 518(3) on board an FPGA type accelerator 510(1), memory 518(4) on board a DSP type accelerator 510(2), and/or memory 518(M) on board another accelerator 510 (N).

Device 500 can further include one or more input/output (I/O) interface(s) 520 to allow device 500 to communicate with input/output devices such as user input devices including peripheral input devices (e.g., a keyboard, a mouse, a voice input device, a touch input device, a gestural input device, and the like) and/or output devices including peripheral output devices (e.g., a display, a printer, audio speakers, and the like). Device 500 can also include one or more network interface(s) 522 to enable communications between device 500 and other networked devices, such network interface(s) 134 of FIG. 1. Bus 524, which can include bus 126, can include one or more of a system bus, a data bus, an address bus, a PCI bus, a Mini-PCI bus, and any variety of local, peripheral, and/or independent buses, can operably connect computer-readable media 504 to processing unit(s) 502.

In the illustrated example, computer-readable media 504 includes robust security foundation frontend 514, which can include robust security foundation frontend 130 from FIG. 1. Robust security foundation frontend 514 can include one or more modules and/or APIs, which are illustrated as blocks 526, 528, 530, 532, and 534, although this is just an example, and the number can vary higher or lower. Functionality described associated with blocks 526, 528, 530, 532, and 534 can be combined to be performed by a fewer number of modules and/or APIs or it can be split and performed by a larger number of modules and/or APIs.

For example, block 526 can represent a cryptographic module with logic to program processing unit(s) 502 of device 500 for performing the hash-based operations and/or the encryption/decryption operations described herein for device 500. For example, device 500 can utilize cryptographic module 526 to generate a fuse-derived secret, a privacy root key, and/or an internal protector key, which are discussed below with regard to FIG. 6. Additionally, device 500 can utilize cryptographic module 526 to generate a cryptographic hash function, which device 500 can use to generate both a device public key and a device private key. Moreover, device 500 can utilize cryptographic module 526 to generate a device public key, a device private key, sealing keys, migration keys, and/or attestation keys, which are also all discussed below with regard to FIG. 6. In some examples, device 500 can further include hardware components that perform some and/or all of the hash-based operations and/or the encryption/decryption operations described herein for device 500. For instance, device 500 can include a hardware component that performs elliptic curve cryptography (ECC), RSA cryptography, advanced encryption standard (AES), data encryption standard (DES), or other types of cryptography in order to generate both the device public key and the device private key.

Block 528 can represent a device verification module with logic to program processing unit(s) 502 of device 500 for performing the verification operations described herein for device 500. For example, device verification module 528 can utilize sealing keys to verify one or more software modules during a regular boot process of device 500. Verifying a software module during the regular boot sequence can include verifying that a HMAC signature on a SMD of the software module is correct using the sealing key of the previous software module in the boot chain as the HMAC key. Additionally, the device 500 can execute the device verification module 528 to verify a software update during a secure update boot sequence. Verifying software updates can include verifying a signature on an updated SMD and/or update constraints for each software module that is updated during the software update process using a sealing key of a previous software module in the secure boot chain. The update constraints can include a module vendor identification, a module identification, and a version number identification for the updated software module. In some examples, verifying the update constraints can include comparing a module vendor identification, a module identification, and a version number identification of the updated versions of the software modules to the previous versions of the software modules.

Furthermore, device 500 can utilize verification module 528 to perform attestation. For instance, in some examples, device 500 can receive an encrypted attestation identity key and attestation certificate from update computing resource(s) 216. Device 500 can then use cryptographic module 526 to decrypt the encrypted attestation identity key and attestation certificate using a generated attestation secret. As such, verification module 528 can perform attestation by checking the attestation identity key and attestation certificate since only device 500 is able to decrypt the encrypted attestation identity key and attestation certificate by generating the correct attestation secret.

Block 530 can represent a sealing module with logic to program processing unit(s) 502 of device 500 for performing the sealing operations described herein. For example, each of the software modules can include secrets that are inaccessible to the subsequent software module in the boot chain. In order to isolate the secrets, sealing module 530 can cause each software module to seal the secrets using the sealing key that the respective software module generates during the boot process. To seal secrets, a software module can derive a necessary number of encryption keys from the sealing key and encrypt the secrets using the derived encryption keys. After sealing the secrets, sealing module 530 can then cause the software modules to erase both the sealing key and the derived encryption keys.

Block 532 can represent a migration module with logic to program the processing unit(s) 502 of device 500 for performing the migration operations described herein. For example, after device 500 updates one or more software modules, the secrets from the previous versions of the one or more software modules are migrated to the new versions of the one or more software modules. To migrate secrets, migration module 532 can cause the software modules to unlock (i.e., decrypt) the secrets locked by the previous versions of the software modules using the migration keys and then lock (i.e., encrypt) the unlocked secrets using the sealing keys generated for the new versions of the software modules.

Block 534 can represent an update module with logic to program the processing unit(s) 502 of device 500 for performing the authorization operations described herein for software modules. For example, update module 534 can cause device 500 to update software modules. In some examples, update module 534 causes device 500 to update software modules after the software modules that are being updated authorize the update. To authorize the update, update module 534 can download (e.g., receive) metadata associated with the software modules to be updated from an update package. The metadata can include SMDs corresponding to each of the updated software modules in the update package. Each software module on device 500 that includes an updated software module in the update package and/or update module 534 can then compare the SMD of the respective updated software module to the current SMD of the software module to determine whether the update meets an update policy for the respective software module. The update policy can include verifying that the SMD of respective updated software module includes data that indicates the correct software module name, a latest version of the software module, and/or that the appropriate authorities signed the SMD of the respective updated software module. When the update meets the update policy, the update module 534 can provide an authorization for updating one or more of the software modules. Otherwise, the update module 534 may not provide the authorization that device 500 requires to update the one or more of the software modules.

FIG. 5 also illustrates device 500 including a robust security foundation framework 536, which can include robust security foundation framework 132 from FIG. 1. Robust security foundation framework 536 can include hardware added to device 500 by a vendor (e.g., device vendor 208) which includes a device secret 538 for device 500. Device secret 538 can include a unique value that identifies the hardware in device 500. As discussed above, device 500 can use device secret 538 to generate each of the cryptographically unique secrets and values (illustrated in FIG. 6) that device 500 uses to perform the security operations described herein. As such, device 500 can cause device secret 538 to be inaccessible to other network devices that try to access device secret 538.

It should be noted that, in some examples, robust security foundation frontend 514 can be included in robust security foundation framework 536. For instance, in some examples, one or more of blocks 526, 528, 530, 532, and 534 can be included in and executed by robust security foundation framework 536. Additionally, in other examples, device 500 may not include robust security foundation framework 536. In such examples, device 500 can store device secret 538 in computer-readable media 504. For instance, device 500 can store device secret 538 the ROM of device 500.

It should be noted that in some examples, device 500 can include a low-resource device. For instance, device 500 can include IoT device with limited resources, such as limited memory and processing capabilities. In some examples, the low resource devices can include 16-1,024 megabytes of internal memory and 4-160 kilobytes of static RAM memory. However, since the framework described herein can be implemented in under twenty kilobytes of code, which can make it suitable for network connected devices with extremely limited resources, the framework is still able to operate on low-resource devices.

Computer-readable media described herein, e.g., computer-readable media 110, 124, 224, 242, 252, 304, 404, and 504, includes computer storage media and/or communication media. In some examples, computer-readable media is specifically described as non-volatile memory. Otherwise, computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a corresponding computing device.

In contrast to computer storage media, communication media can embody computer-readable instructions, data structures, program modules, or other data in a modulated data signal, such as a carrier wave, or other transmission mechanism. As defined herein, computer storage media does not include communication media.

Figure 6:
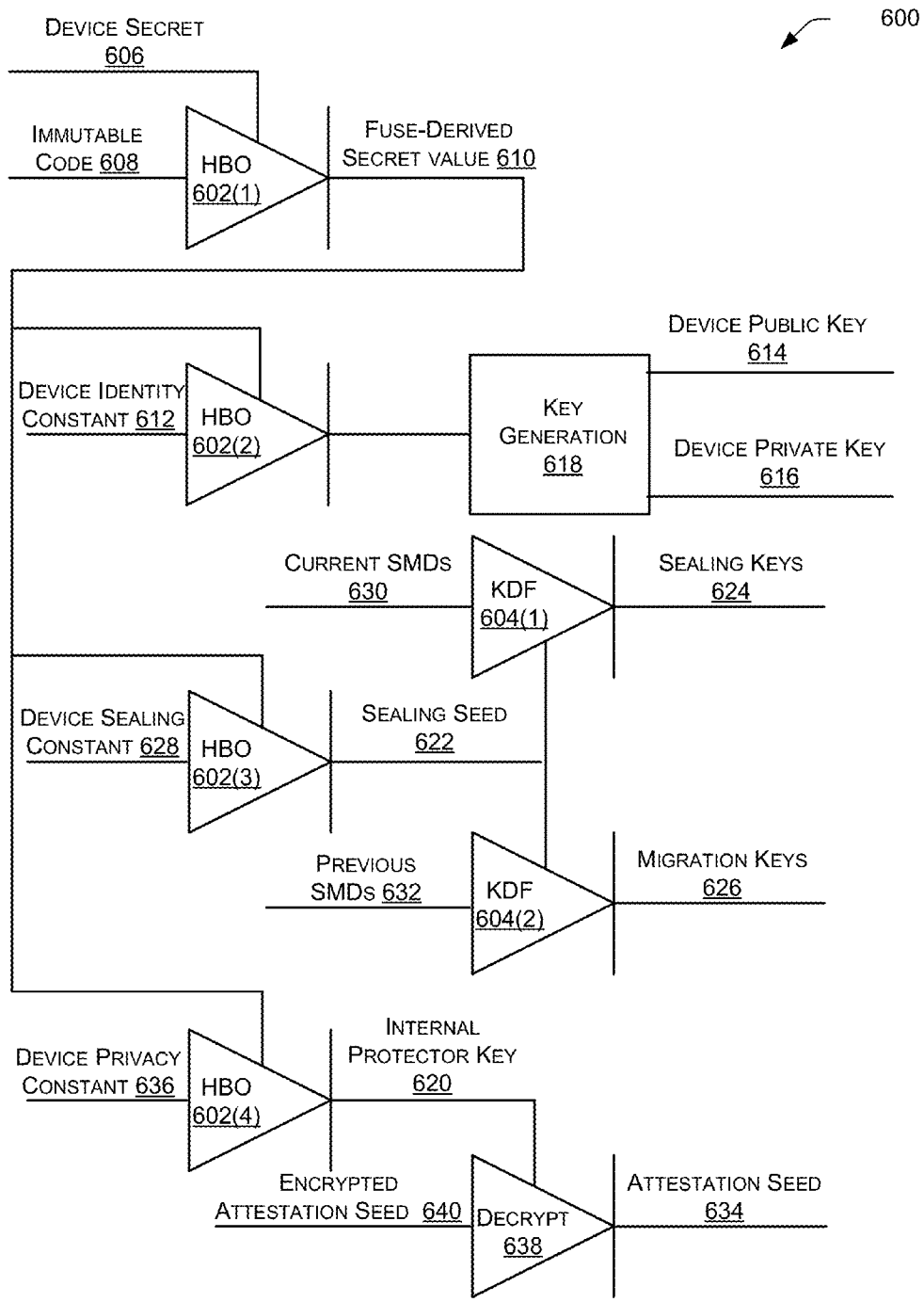
FIG. 6 depicts an example process of a device producing cryptographically unique secrets and values that the device uses for performing security operations.

FIG. 6 depicts an example process 600 performed by a device, such as device 500 from FIG. 5, for producing cryptographically unique secrets and values that the device uses for performing the security operations described herein. As illustrated, the device can perform a series of hash-based operations (HBOs) 602 and key derivation functions (KDFs) 604 to produce the cryptographically unique secrets and values. Since the device can use device secret 606 to begin performing the series of HBOs 602 and KDFs 604, each of the cryptographically unique secrets and values is unique to the device. Furthermore, in the example of FIG. 6, each of the HBOs 602 and KDFs 604 can include a "one-way" operation, such that an external device cannot reverse the operations to derive the device's unique values, which include device secret 606, immutable code 608, and fuse-derived secret (FDS) value 610.

As illustrated in FIG. 6, the device can use device secret 606, which can include device secret 540 from FIG. 5, and immutable code 608 to produce FDS value 610. For instance, in the example of FIG. 6, the device can execute a HBO 602(1) using device secret 606 and immutable code 608 to generate FDS value 610. In some examples, HBO 602(1) can include hashing the concatenation of a hash value of immutable code 608 to secret value 606 to produce FDS value 610. FDS value 610 can include a value that the device uses to derive each of the cryptographically unique secrets and values. In some examples, after generating FDS value 610, the device can disable access to device secret 606 to prevent attacks from malicious code that may be installed on the device.

The device can use FDS value 610 and device identity constant 612 to produce both device public key 614 and device private key 616. Device identity constant 612 can include a device-unique binary value that the device uses to produce both device public key 614 and device private key 616. Device public key 614 can include a public identification key for the device that uniquely represents the hardware identity on the device. Device private key 616 can include a private identification key for the device that the device uses after receiving encrypted values and secrets from distributed computing resource(s) 202.

For instance, in the example of FIG. 6, the device can execute a HBO 602(2) using FDS value 610 and device identity constant 612 to generate a cryptographic hash function. In some examples, HBO 602(2) can include hashing the concatenation of device identity constant 612 to FDS value 610 to produce the cryptographic hash function. The device can then execute key generation 618 using the cryptographic hash function to generate both device public key 614 and device private key 616. In some examples, key generation 618 can employ elliptic curve cryptography, or other suitable types of cryptography. In some examples, after generating device private key 616, the device encrypts device private key 616 using internal protector key 620, which is described below. The device encrypts device private key 616 in order to protect device private key 616 from malicious attacks by external computing devices.

Using FDS value 610, the device can further produce sealing seed 622, which the device can use to generate both sealing keys 624 and migration keys 626. For instance, in the example of FIG. 6, the device can execute a HBO 602(3) using FDS value 610 and device sealing constant 628 to generate sealing seed 622, where device sealing constant 628 can include a device-unique string. In some examples, HBO 602(3) can include hashing the concatenation of device sealing constant 628 to FDS value 610 to produce sealing seed 622. The device can then execute a KDF 604(1) to generate sealing keys 624 from sealing seed 622 using current SMDs 630 of current versions of one or more software modules, and/or the device can execute a KDF 604(2) to generate migration keys 626 from privacy rook key 622 using previous SMDs 632 of previous versions of the one or more software modules.

The device can further use FDS value 610 to generate internal protector key 620, which the device can then use to retrieve attestation seed 634. For instance, in the example of FIG. 6, the device can execute a HBO 602(4) using FDS value 610 and device privacy constant 636 to generate internal protector key 620, where device privacy constant 636 can include a device-unique secret value. In some examples, HBO 602(4) can include hashing the concatenation of device privacy constant 636 to FDS value 610 to produce internal protector key 620. The device can then use internal protector key 620 to decrypt 638 encrypted attestation seed 640 to produce attestation seed 634. As will be discussed in more detail below, the device uses attestation seed 634 during attestation. The device can receive attestation seed 634 from the distributed computing resource(s) 202 encrypted by internal protector key 620 and/or the device can encrypt attestation seed 634 using internal protector key 620 before storing attestation seed 634 in computer-readable media.

It should be noted that in some examples, each of device identity constant 612, device sealing constant 628, and device privacy constant 636 includes a unique binary value. In such examples, neither of device identity constant 612, device sealing constant 628, nor the device privacy constant 636 include the same binary value. Additionally, in some examples, each of device identity constant 612, device sealing constant 628, and device privacy constant 636 can be updated to a new unique binary value. For instance, one or more of the device identity constant 612, device sealing constant 628, and device privacy constant 636 can be updated when compromised.

Figure 7:
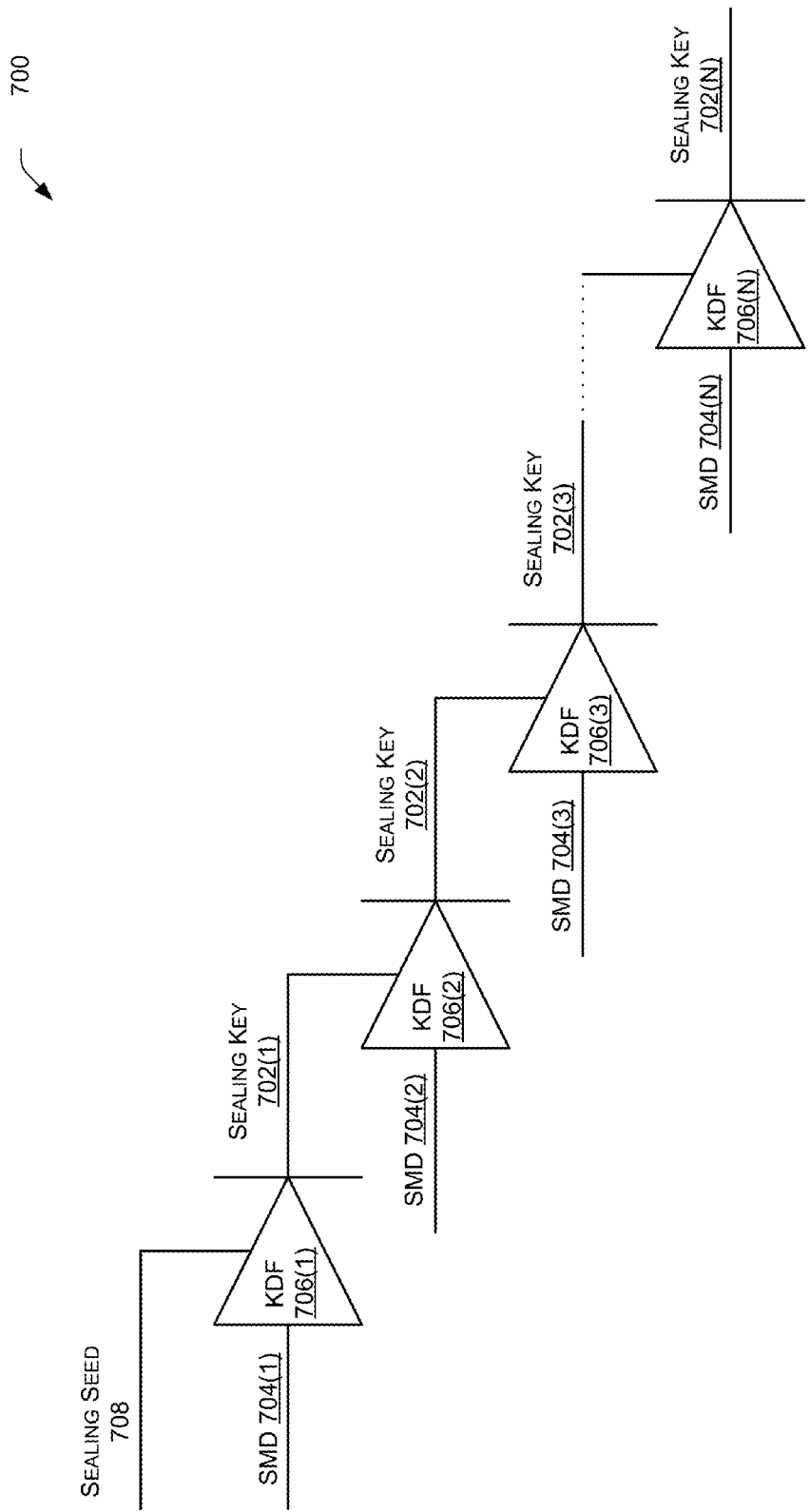
FIG. 7 depicts an example process for generating sealing keys.

FIG. 7 depicts an example process 700 for generating sealing keys 702. As illustrated, a device, such as device 500, generates sealing keys 702 using SMDs 704 of one or more software modules on the device, where SMDs 704 can include current SMDs 630 from FIG. 6. Each of SMDs 704 can include a data structure that defines a respective software module's identity. For instance, the SMD for a software module can include data that represents a software module identifier, a software module version, a vendor identifier, one or more digests for the executable images comprising the software module, a vendor signature, and a device signature (e.g., HMAC) for the software module. As such, the device generates a sealing key 702 for each of the software modules, where the respective sealing key 702 is unique to the respective software module.

For instance, the device and/or the robust security foundation framework can generate a first sealing key 702(1) for a first software module using a first SMD 704(1) of the first software module. In some examples, the device and/or the robust security foundation framework can execute a KDF 706(1) to generate a first sealing key 702(1) from the first SMD 704(1) using sealing seed 708, which can include sealing seed 622 from FIG. 6. The first software module can then use the first sealing key 702(1) to produce one or more encryption keys for encrypting the secrets of the first software module. Furthermore, the device and/or the robust security foundation framework can use sealing seed 708 to verify the integrity of the first software module by checking a HMAC signature on the first SMD 704(1) using sealing seed 708. If the device and/or the robust security foundation framework verifies integrity of the first software module, then the first software module is executed. However, if the device and/or the robust security foundation framework cannot verify the integrity of the first software module, then the robust security foundation framework can cause the device to stop the boot sequence and/or perform remediation.

Remediation can include determining whether a software module can be fixed, rebooting the device in a recovery mode, returning to the boot chain without performing policy checks, replacing the failed software module, or restoring the failed software module from a back-up storage. In the example of FIG. 7, it will be assumed that each of the software modules is able to verify the software module's respective integrity using the software module's sealing key 702.

After the first software module finishes its execution, the device and/or the robust security foundation framework generates a second sealing key 702(2) using a second SMD 704(2) of the second software module and the first sealing key 702(1). In some examples, the device and/or the robust security foundation framework can execute KDF 706(2) to generate the second sealing key 702(2) from the second SMD 704(2) using the first sealing key 702(1). The second software module can then use the second sealing key 702(2) to produce one or more encryption keys for encrypting the secrets of the second software module. Additionally, the device, the robust security foundation framework, or the first software module can use the first sealing key 702(1) to verify the integrity of the second software module and then initiate execution of the second software module.

After the second software module is executed, the device and/or the robust security foundation framework can generate a third sealing key 702(3) using a third SMD 704(3) of the third software module and the second sealing key 702(2). In some examples, the device, robust security foundation framework, or the second software module can execute KDF 706(3) to generate the third sealing key 702(3) from the third SMD 704(3) using the second sealing key 704(2). The third software module can then use the third sealing key 702(3) to produce one or more encryption keys for encrypting the secrets of the third software module. Additionally, the device, robust security foundation framework, or the second software module can use the second sealing key 702(2) to verify the integrity of the third software module.

Each of the software module in the boot sequence can perform the operations described above until the final sealing key 702(N) is generated using the sealing key of the previous software module in the boot chain and the SMD 704(N) of the final software module. For instance, in some examples, the device, the robust security foundation framework, or the penultimate software module can generate the final sealing key 702(N) by executing KDF 706(N) on the final SMD 704(N) and the sealing key of the penultimate software module. The final software module can then use the final sealing key 702(N) to produce one or more encryption keys for encrypting the secrets of the final software module. Additionally, the device, the robust security foundation framework, or the penultimate software module can use the penultimate sealing key to verify the integrity of the final software module.

It should be noted that when generating sealing keys 702, the device, the robust security foundation framework, and/or the each software module can execute a hash function of the SMDs 704 and use the hash function of the SMDs 704 when deriving the respective sealing key 702. For instance, the device, the robust security foundation framework, or first software module above can execute the first KDF 706(1) to generate the first sealing key 702(1) from a hash of the first SMD 704(1) using the privacy root key. The device, the robust security foundation framework, or the second software module can then execute the second KDF 706(2) to generate the second sealing key 702(2) from a hash of the second SMD 704(2) using the first sealing key 702(1). Each of the software modules can then continue to generate the remaining sealing keys 702 using a similar process. In some examples, executing the hash function of the SMDs can include hashing the contents of each of the SMDs except for the signature blocks.

It should further be noted that the device and/or the robust security foundation framework can use a process similar to 700 to produce migration keys for each of the software modules when one or more of the software modules is updated by the device, except, to produce the migration keys, the device and/or the robust security foundation framework uses the previous versions of the SMDs. For instance, the device can update each of the software modules in the boot chain. When updating the software modules, the device can copy the previous versions of the SMDs, which may include previous SMDs 632 from FIG. 6, in computer-readable storage (e.g., NV memory) and then replace the original instances of the previous versions of the SMDs with the newer versions of the SMDs. The device can then retrieve the previous versions of the SMDs from the computer-readable storage and use the previous versions of the SMDs to generate migration keys for each of the software modules, such as migration key 626, using a similar process as generating sealing keys 702. The device can then use the migration keys and sealing keys 702 for the software modules to migrate secrets from the previous versions of the software modules to the newer versions of the software modules.

For examples, since the device can generate each of the migration keys using the previous versions of the SMDs, the device can use the migration keys to unlock (e.g., decrypt) the secrets of the software modules. In some examples, each of the software modules uses its respective migration key to generate one or more decryption keys that the respective software module uses to decrypt the secrets of the respective software module. The software modules can then lock (e.g., encrypt) the secrets using sealing keys 702. In some examples, each of the software modules can use its respective sealing key 702 to generate one or more encryption keys that the respective software module uses to encrypt the secrets.

Figure 8:
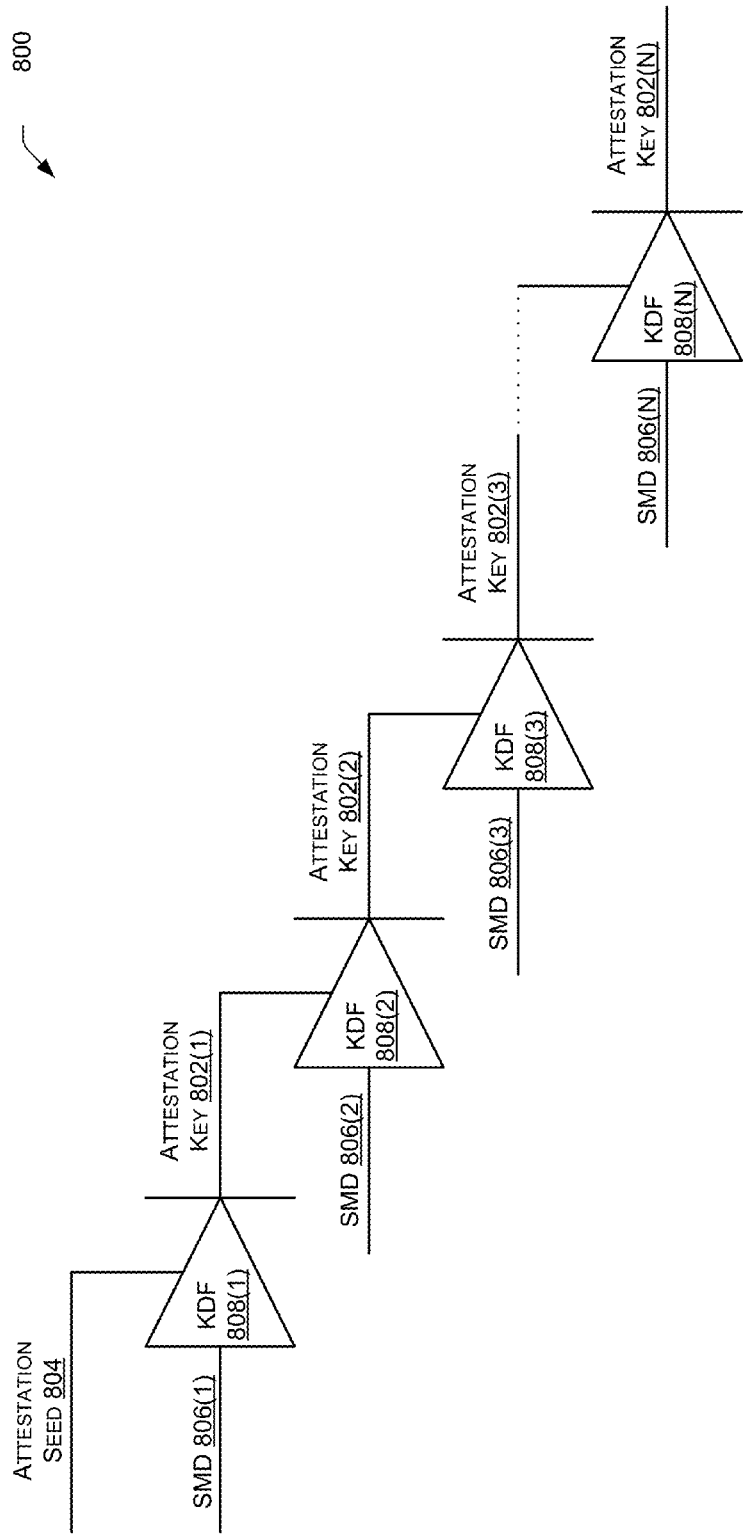
FIG. 8 depicts an example process for generating attestation keys.

FIG. 8 depicts an example process 800 for generating attestation keys 802 using attestation seed 804, which can include attestation seed 634 from FIG. 6. To generate attestation keys 802, a device, such as device 500, and/or the robust security foundation framework can utilize a similar process as described above for generating sealing keys 702, except the process starts with attestation seed 804. For instance, given attestation seed 804 and first SMD 806(1) of the first software module, the device and/or the robust security foundation framework can execute a first KDF 808(1) to generate the first attestation key 802(1) from the first SMD 806(1) of the first software module using attestation seed 804. The device and/or the robust security foundation framework can then execute the remaining KDFs 808(2)-808(N) for each software module in the boot chain to generate each of the remaining attestation keys 802(2)-802(N) from respective SMDs 806(2)-806(N) of the remaining software modules using the attestation key from the previous software module in the boot chain. In some examples, when generating attestation keys 802, the device and/or the robust security foundation framework can first take a hash of the SMDs 806 before executing KDFs 808 to generate attestation keys 802.

It should be noted that in some examples, the device uses the final attestation key, such as attestation key 802(N) in FIG. 8, as the attestation secret described above. Additionally, in some examples, since the updating computing resource(s) 216 know what software modules are one the device, the updating computing resource(s) 216 can use a similar process to generate the attestation secret for the device.

Figure 9:
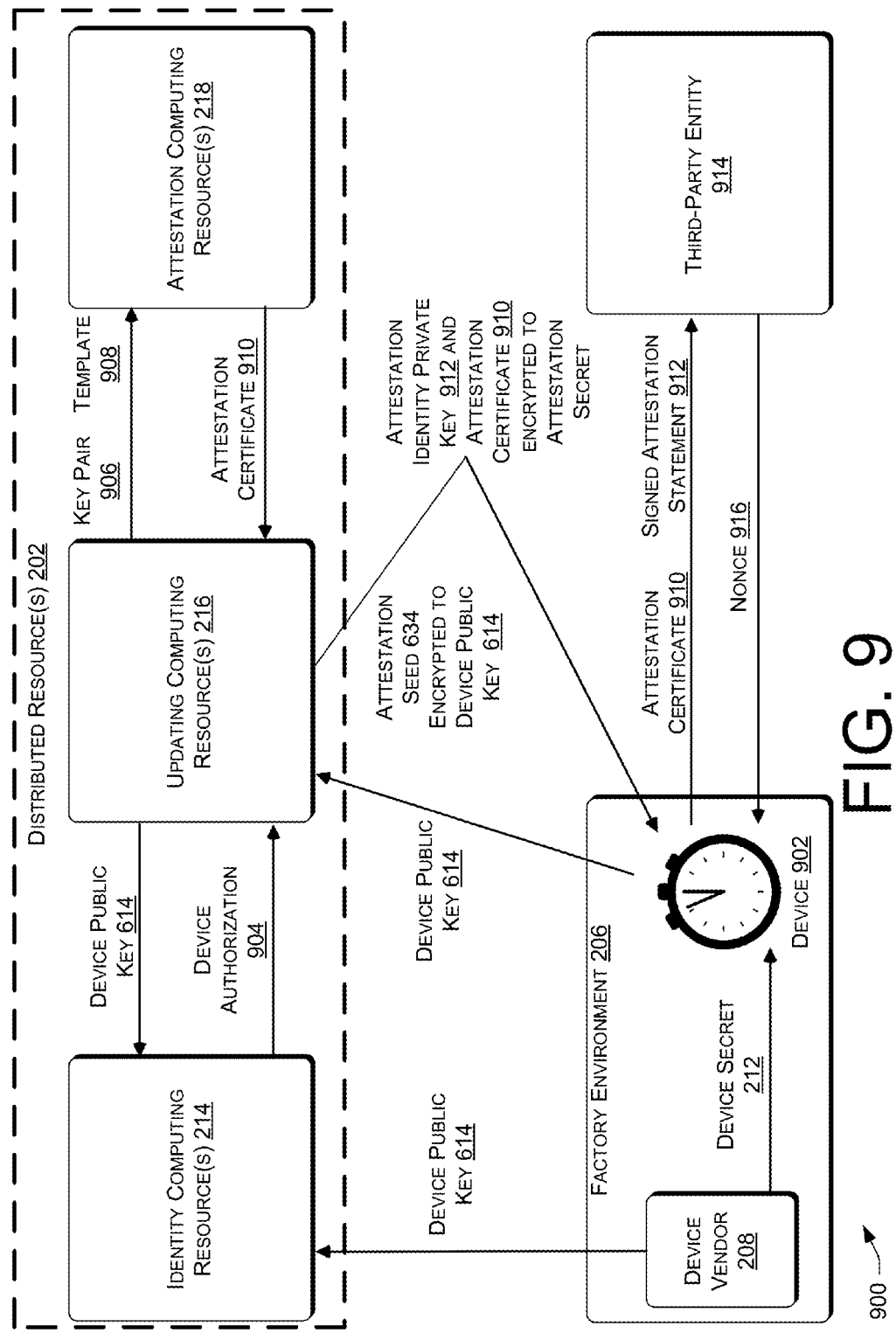
FIG. 9 depicts a block diagram illustrating an example environment in which an asymmetric device can operate.

FIG. 9 depicts a block diagram depicting an example environment 900 in which a device 902, which may include device 500 from FIG. 5, can operate using asymmetric cryptography. In the illustrated example, device vendor 208 generates device secret 212 and programs device secret 212 into device 902. Device vendor 208 can also generate device public key 614, using a similar process as the device in FIG. 6, and sends device public key 614 to identity computing resource(s) 214. Identity computing resource(s) 214 can receive device public key 614 from device vendor 208 and store device public key 614 in a database, such as key database 232 from FIG. 2.

As further illustrated in FIG. 9, device 902 can send device public key 614 to updating computing resource(s) 216. Updating computing resource(s) 216 can use device public key 614 to verify that device public key 614 belongs to a known device by sending device public key 614 to identity computing resource(s) 214. Identity computing resource(s) 214 can use device public key 614 received from updating computing resource(s) 216, check the received device public key 614 against each of the device public keys that identity computing resource(s) 214 stores in key database 232, and send device authorization 904 back to updating computing resource(s) 216 when identity computing resource(s) 214 can authorize device 902.

After receiving device authorization 904, updating computing resource(s) 216 can send (e.g., inject) attestation seed 634 back to device 902. In some examples, updating computing resource(s) 216 generates attestation seed 634 specifically for device 902 by generating a random attestation seed. Additionally, in some examples, updating computing resource(s) 216 further encrypts attestation seed 634 by device public key 614 so that sending attestation seed 634 to device 902 is secure. When updating computing resource(s) 216 encrypt attestation seed 634 using device public key 614, device 902 can then use a device private key, such as device private key 616 from FIG. 6, to decrypt attestation seed 634.

Updating computing resource(s) 216 can further generate key pair 906 (e.g., attestation identity key) and certification template 908, and send both key pair 906 and attestation template 908 to attestation computing resource(s) 218. Attestation computing resource(s) 218 can then generate attestation certificate 910 by signing attestation template 908, and send attestation certificate 910 to updating computing resource(s) 216.

Updating computing resource(s) 216 can further generate an attestation secret using attestation seed 634, using a similar process as described above for the device. Updating computing resource(s) 216 can then encrypt both attestation identity private key 912 (from key pair 906) and attestation certificate 910 using the attestation secret, and send the resulting attestation identity key import blob to device 902.

Device 902 can use attestation seed 634 to generate an attestation secret that is similar to the attestation secret generated by updating computing resource(s) 216. Device 902 can then use the attestation secret to decrypt both attestation identity private key 912 and attestation certificate 910. Since device 902 is the only device that can generate the attestation secret needed to decrypt attestation identity private key 912 and attestation certificate 910, device 902 can verify the software modules stored on device 902 based on the decryption. In some examples, device 902 can then encrypt the private portions of attestation identity private key 912 using a sealing key, such as one of sealing keys 702 from FIG. 7. For instance, device 902 can encrypt the private portions of attestation identity private key 912 using the last sealing key in the boot chain, such as sealing key 702(N), and then decrypt attestation identity private key 912 using sealing key 902(N) when device 902 needs attestation identity private key 912 to verify the integrity of device 902.

Also illustrated in FIG. 9, device 902 sends attestation certificate 910 and a signed attestation statement 912 to third-party entity 914. Device 902 can generate signed attestation statement 912 by signing the generated attestation secret. Third-party entity 914 can then use both attestation certificate 910 and signed attestation statement 912 to verify the integrity of device 902. In response to verifying device 902, third-party entity 914 can send nonce 916 back to device 902 notifying device 902 of the verification.

Figure 10:
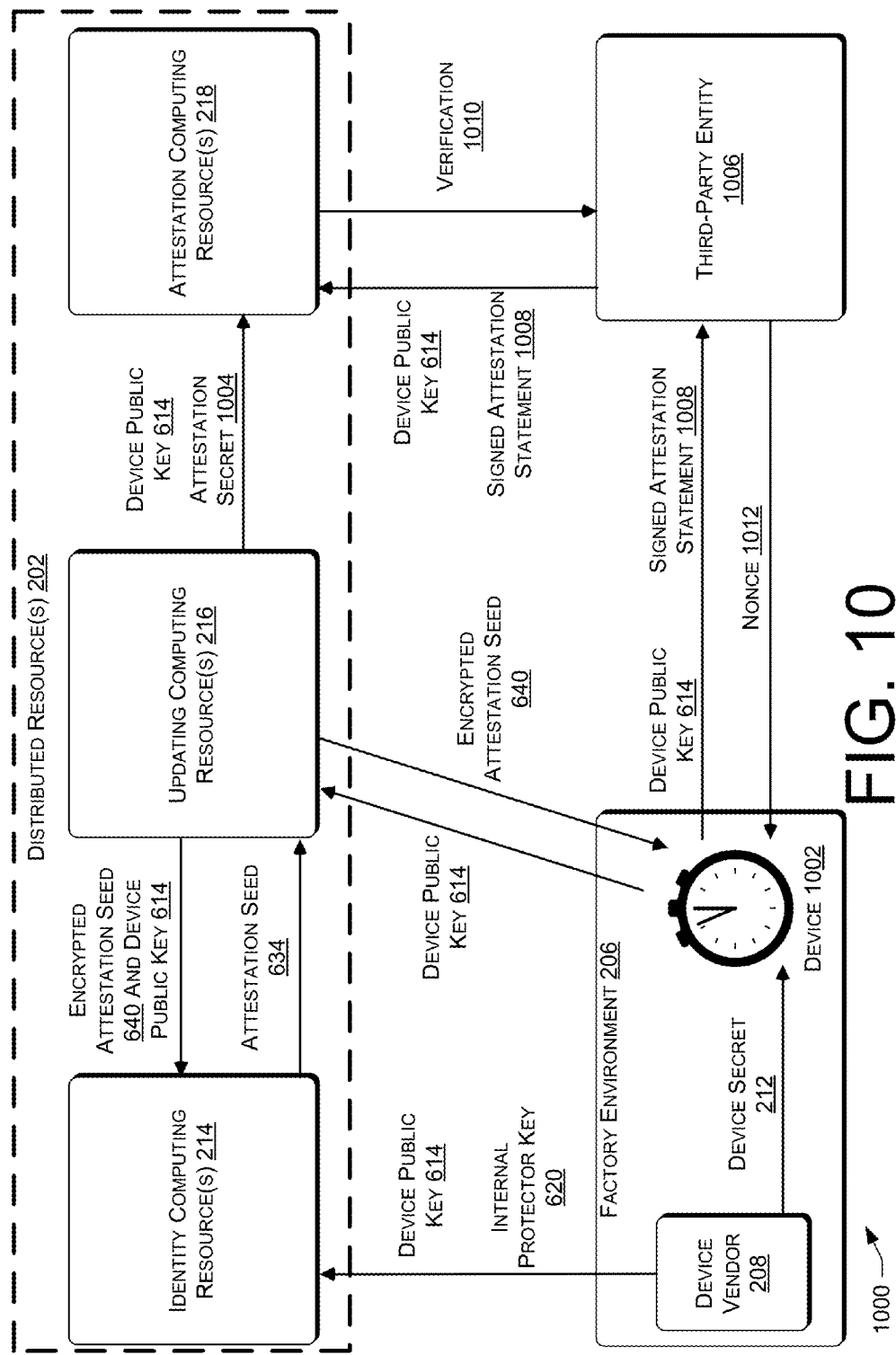
FIG. 10 depicts a block diagram illustrating an example environment in which symmetric device can operate.

FIG. 10 depicts a block diagram depicting an example environment 1000 in which a device 1002, which may include device 500 from FIG. 5, can operate using symmetric cryptography. In the illustrated example, device vendor 208 generates device secret 212 and programs device secret 212 into device 1002. Device vendor 208 can also generate device public key 614 and internal protector key 620, using a similar processes as the device in FIG. 6, and can send device public key 614 and internal protector key 620 to identity computing resource(s) 214. Identity computing resource(s) 214 can receive device public key 614 and internal protector key 620 from device vendor 208 and store device public key 614 and internal protector key 620 in one or more databases, such as key database 232 from FIG. 2.

Also illustrated in FIG. 10, device 1002 can send device public key 614 to updating computing resource(s) 216. Updating computing resource(s) 216 can use device public key 614 to verify the identity of device 1002 by sending device public key 614 and encrypted attestation seed 640 to identity computing resource(s) 214. Identity computing resource(s) 614 can use device public key 614 to identity device 1002 and in response, decrypt encrypted attestation seed 640 using the stored internal protector key 620. Identity computing resource(s) 614 can then send attestation seed 634 back to updating computing resource(s) 216, which verifies the identity of device 1002.

Updating computing resource(s) 216 can then generate an attestation secret 1004 using attestation seed 634, which is discussed above, and send attestation secret 1004 and device public key 614 to attestation computing resource(s) 618. Updating computing resource(s) 216 can further send encrypted attestation seed 640 to device 1002 so that device can generate attestation secret 1004 using attestation seed 634. For instance, device 1002 can receive encrypted attestation seed 640 from updating computing resource(s) 216, decrypt encrypted attestation seed 640 using internal protector key 620, and generate attestation secret 1004 using attestation seed 634.

After device 1002 generates attestation secret 1004, device 1002 can use attestation secret 1004 when a third party entity 1006 wants to verify device 1004. For instance, and as illustrated in FIG. 10, device 1002 generates signed attestation statement 1008 using attestation secret 1004 and sends signed attestation statement 1008 and device public key 614 to third-party entity 1006. Third party entity 1006 then sends signed attestation statement 1008 and device public key 614 to attestation computing resource(s) 218. Attestation computing resource(s) 218 can also receive device public key 614 and attestation secret 1004 from updating computing resource(s) 216.

Using device public key 614 and attestation secret 1004 received from updating computing resource(s) 216 and device public key 614 and signed attestation statement 1008 received from third-party entity 1006, attestation computing resource(s) 218 can verify device 1002. In some examples, attestation computing resource(s) 218 can verify the integrity of device 1002 using device public key 614 received from both updating computing resource(s) 216 and third-party entity 1006, and then verify signed attestation statement 1008 using attestation secret 1004. Attestation computing resource(s) 218 can then send a verification 1010 to third-party entity 1006 when attestation computing resource(s) 218 verifies device 1002, or send a messaging indicating that device 1002 cannot be verified when attestation computing resource(s) 218 cannot verify device 1002 using attestation secret 1004 and signed attestation statement 1008.

Also illustrated in FIG. 10, third-party entity 1006 can send nonce 1012 to device 1002. In some examples, third-party entity 1006 sends nonce 1012 to device 1002 in response to third-party entity 1006 receiving verification 1010 from attestation computing resource(s) 218.

FIGS. 11-17 are flow diagrams of illustrative processes for facilitating a framework that provides a core TCB of an electronic device with various security capabilities. The processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 11:
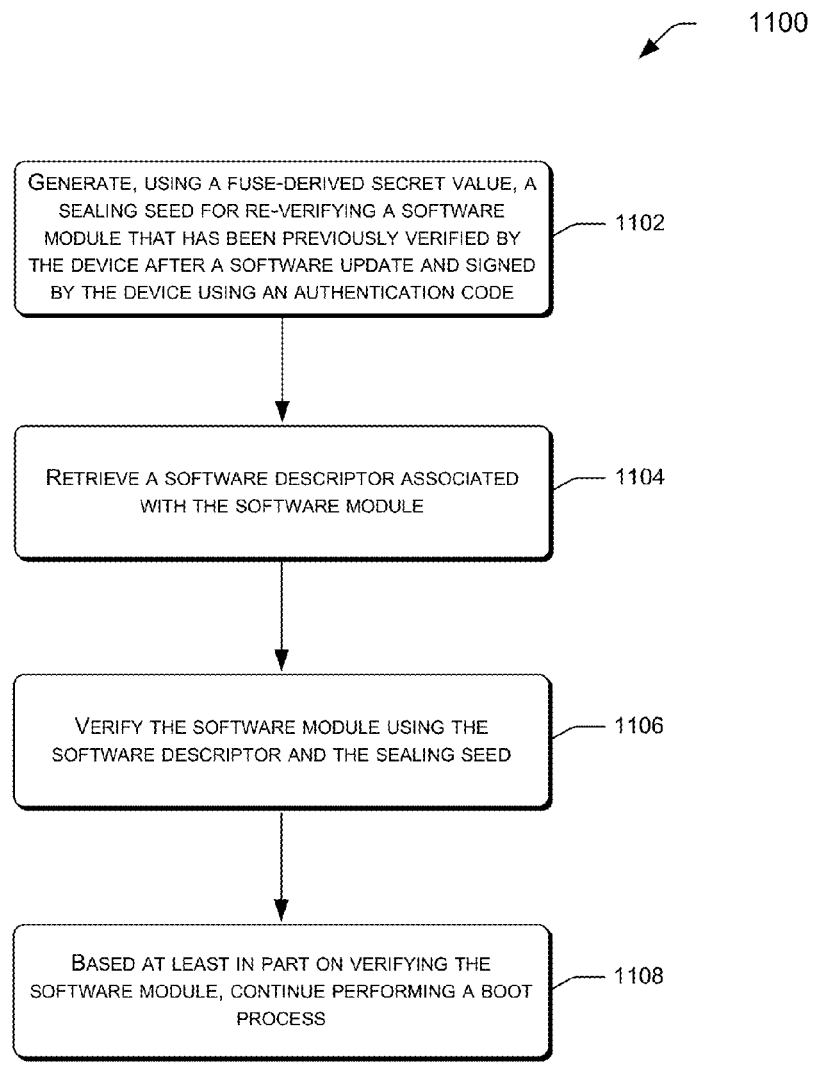
FIG. 11 is a flow diagram of an illustrative process for performing a boot sequence.

FIG. 11 is a flow diagram of an illustrative process 1100 for performing a boot sequence. At 1102, a device generates, using a FDS value, a sealing seed for re-verifying a software module that has previously been verified by the device after a software update and signed by the device using an authentication code. For instance, the device can execute a HBO using FDS value and a device sealing constant to generate the sealing seed for verifying the software module. The software module can include the first software module in the secure boot sequence.

At 1104, the device retrieves a SMD associated with the software module. At 1106, the device verifies the software module using the SMD and the sealing seed. For instance, to verify the software module, the device can check the authentication code on the SMD using the sealing seed.

At 1106, the device can, based at least in part on verifying the software module, continue to perform the boot process. For instance, the device can generate a sealing key for the software module using the sealing seed and the SMD. The device can then use the sealing key to generate one or more encryption keys for encrypting the secrets of the software module. Additionally, the device can verify the next software module in the secure boot chain using the sealing key, generate a new sealing key for the next software module, and encrypt the secrets of the next software module using the next sealing key. The device can then continue to perform the above steps for each software module in the secure boot chain.

Figure 12:
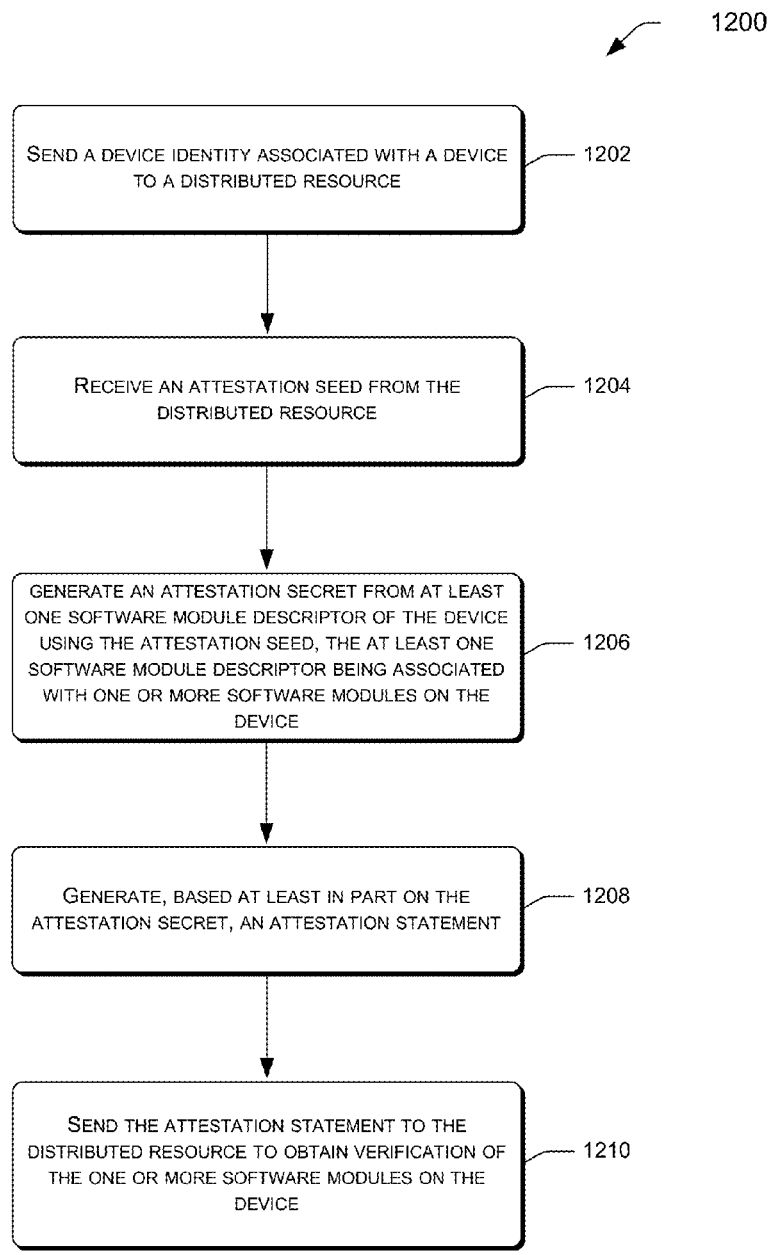
FIG. 12 is a flow diagram of an illustrative process for generating an attestation secret and using the attestation secret during attestation for the device.

FIG. 12 is a flow diagram of an illustrative process 1200 for generating an attestation secret and using the attestation secret during attestation for the device. At 1202, a device can send a device identity, such as a public device identity, associated with the device to a distributed resource. For instance, the device can send a device public key to an update authority.

At 1204, the device can receive an attestation seed from the distributed resource. For instance, the update authority can generate the attestation seed for the device in response to receiving the device public key. The update authority can then encrypt the attestation seed using the device public key and send the attestation seed encrypted to the device public key to the device. In response, the device can decrypt the attestation seed encrypted to the device public key using a device private key. In some examples, the update authority sends the attestation seed to the device in response to the device updating one or more software modules.

At 1206, the device can generate an attestation secret from at least one SMD using the attestation seed, the at least one SMD being associated with one or more software modules on the device. For instance, the device can execute the KDF to generate an attestation key from a first SMD of a first software module using the attestation seed. When more than one software module is present, the device can execute a KDF to generate an attestation key for each of the software modules from the SMD associated with the respective software module using an attestation key that is generated by the previous software module in a boot sequence of the device. In some examples, the last attestation key generated by the device is used as the attestation secret.

At 1208, the device can generate, based at least in part on the attestation secret, an attestation statement. For instance, the device can generate the attestation statement using both the attestation secret and the device public key. At 1214, the device can send the attestation statement to the distributed resource to obtain verification of the one or more software modules on the device. For instance, the device can send the attestation statement to an attestation authority, wherein the attestation authority also receives an attestation secret from the update authority. The attestation authority can then verify the one or more software modules on the device using the attestation statement and the attestation secret.

Figure 13:
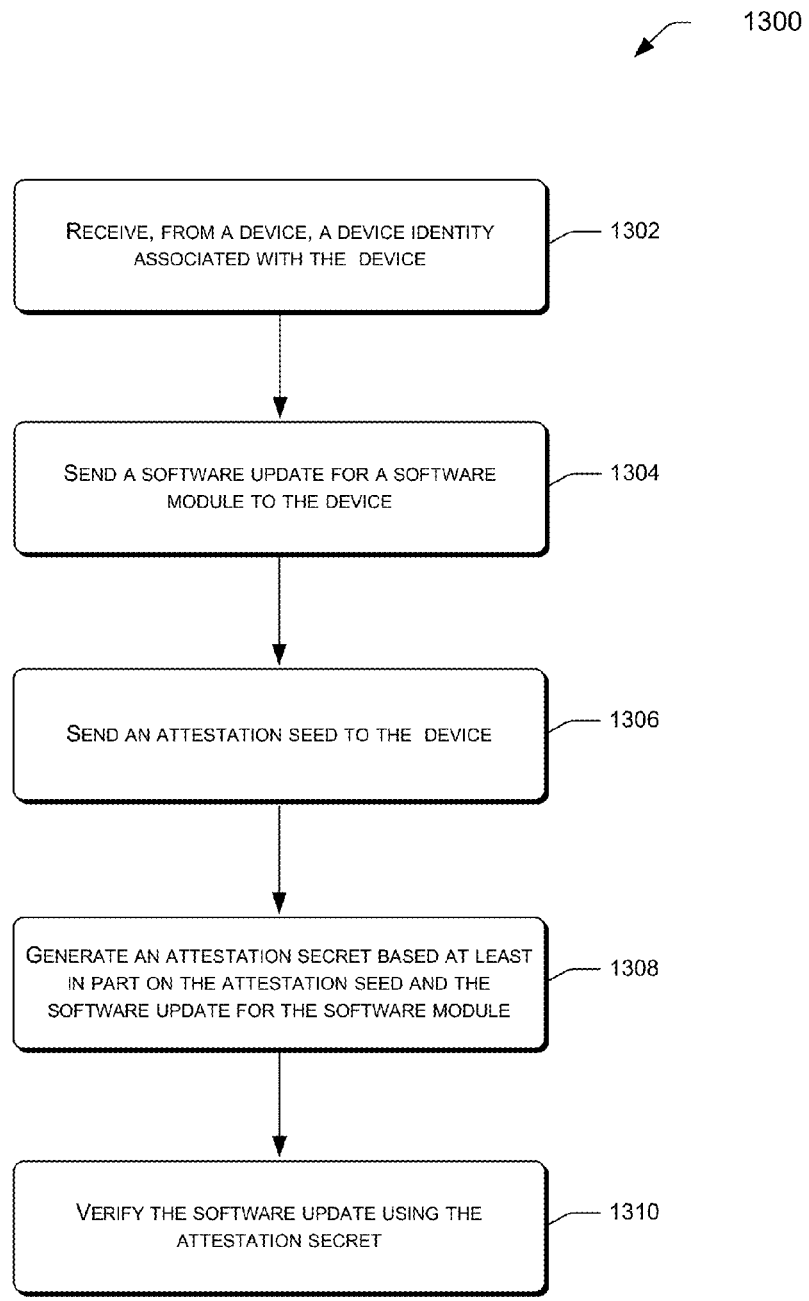
FIG. 13 is a flow diagram of an example illustrative process for verifying an update of a device using attestation.

FIG. 13 is a flow diagram of an illustrative process 1300 for verifying an update of a device using attestation. At 1302, an update authority can receive, from a device, a device identity associated with the device. For instance, the update authority can receive a device public key from the device. In some examples, the update authority can then verify the device by sending the device public key to an identity authority.

At 1304, the update authority can send a software update for a software module to the device and at 1306, the update authority can send an attestation seed to the device. For instance, the update authority can generate the attestation seed in response to sending the software update to the device. In some examples, the update authority can then encrypt the attestation seed using the device public key and send the attestation seed encrypted to the device public key to the device. Additionally or alternatively, in some examples, the update authority can encrypt the attestation seed using an internal protector key associated with the device. The update authority can then send the encrypted attestation seed to the device.

At 1308, the update authority can generate an attestation secret based at least in part on the attestation seed and the software update for the software module. For instance, the update authority can execute a KDF on the SMD associated with the software module using the attestation seed to generate the attestation secret.

At 1310, the update authority can verify the software update using the attestation secret. For instance, in some examples, the update authority can send the attestation secret encrypted to the device public key to an attestation authority that performs attestation to verify software updates. The update authority can then receive a message from the attestation authority indicating a verification for the software update. In some examples, the update authority can encrypt an attestation identity key and attestation certificate using the attestation secret and send the encrypted attestation identity key and attestation certificate to the device. The device can then use the encrypted attestation key and attestation certificate to verify the one or more software modules.

Figure 14:
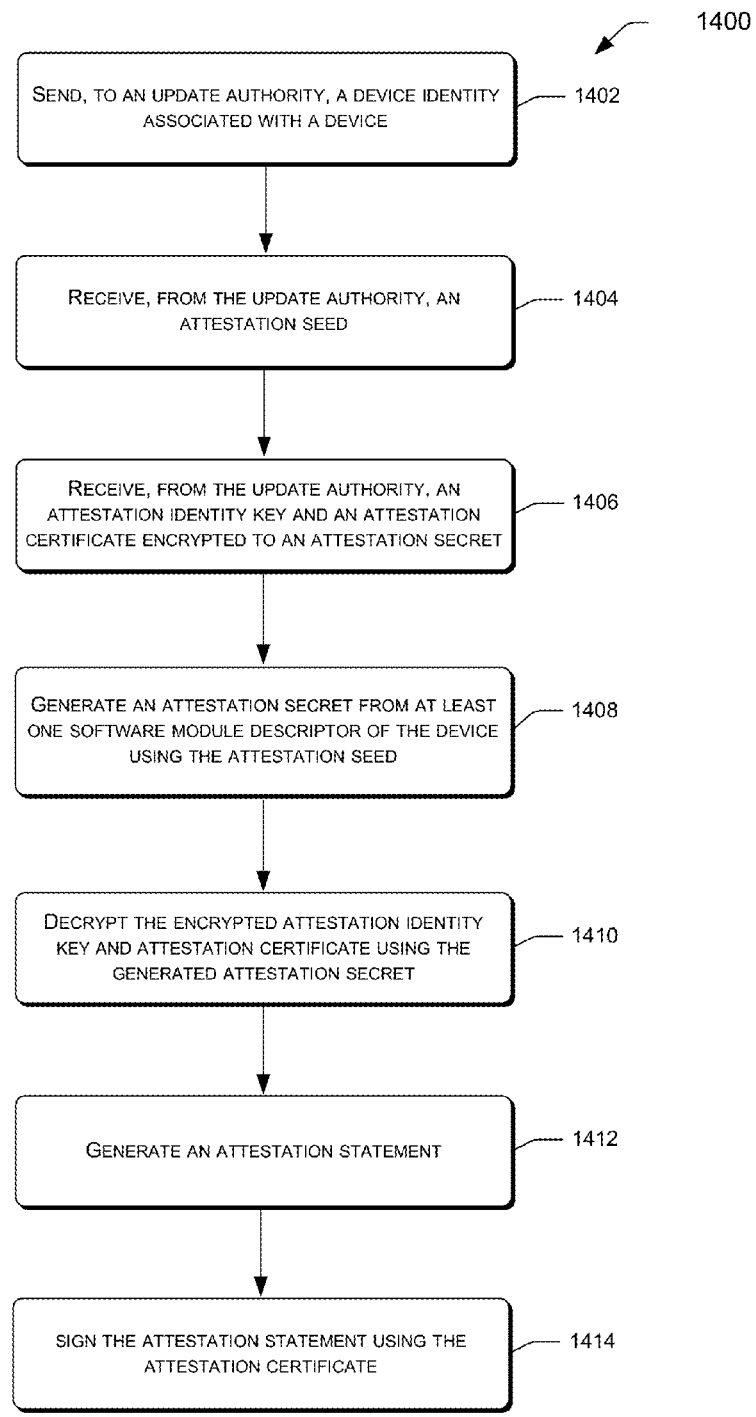
FIG. 14 is a flow diagram of an example illustrative process for verifying one or more software modules of a device using an attestation identity key and attestation certificate.

FIG. 14 is a flow diagram of an example illustrative process 1400 for verifying one or more software modules of a device using an attestation identity key and attestation certificate. At 1402, the device can send, to an update authority, a device identity associated with the device. For instance, the device can send a device public key associated with the device to the update authority.

At 1404, the device can receive, from the update authority, an attestation seed and at 1406, the device can receive, from the update authority, an attestation identity key and an attestation certificate encrypted to an attestation secret.

At 1408, the device can generate an attestation secret from at least one SMD using the attestation seed. In some examples, the at least one SMD can be associated with one or more software modules on the device. For instance, the device can execute the KDF to generate an attestation key from a first SMD of a first software module using the attestation seed. When more than one software module is present, the device can execute a KDF to generate an attestation key for each of the software modules from the SMD associated with the respective software module using an attestation key that is generated by the previous software module in a boot sequence of the device. In some examples, the last attestation key generated by the device is used as the attestation secret.

At 1410, the device can decrypt the encrypted attestation identity key and attestation certificate using the generated attestation secret. In some examples, the device can only decrypt the encrypted attestation identity key and attestation certificate when the device generates the correct attestation statement.

At 412, the device can generate an attestation statement and at 414, the device can sign the attestation statement using the attestation certificate. For instance, the device can generate the attestation statement using the attestation secret. The device can then sing the generated attestation statement using the attestation certificate.

It should be noted that in some examples, the device can further re-encrypt private portions of the attestation identity key using a sealing key. When re-encrypting the attestation identity key, the sealing key can include the sealing key of the last software module i.e., the sealing key that produced the attestation secret. In such examples, the device can further decrypt the private portions of the attestation identity key and use the private portions to and the attestation secret to sign an attestation statement. In some examples, the device can further send the attestation statement and attestation certificate to a third-party entity. The third-party entity can then use the signed attestation statement and attestation certificate to verify the device.

Figure 15:
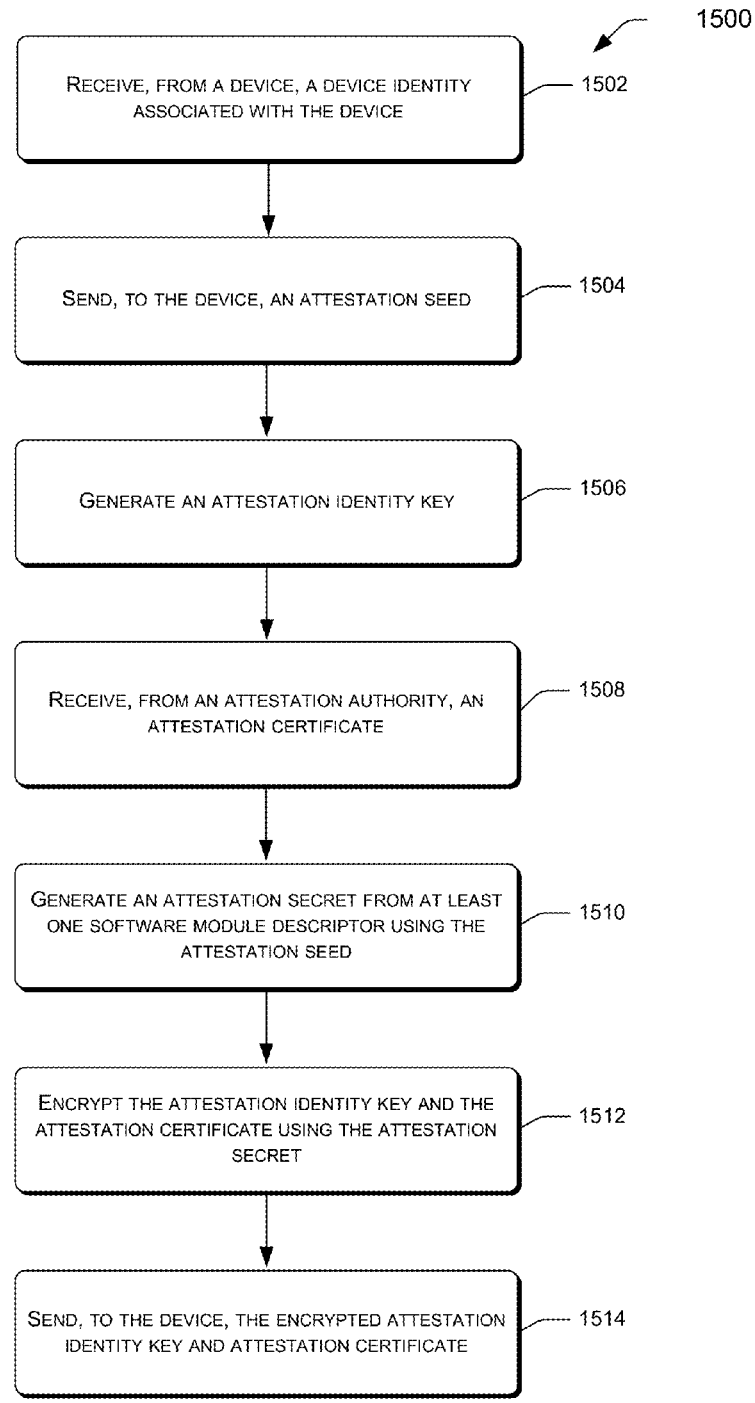
FIG. 15 is a flow diagram of an example illustrative process for providing a device with an attestation identity key and attestation certificate.

FIG. 15 is a flow diagram of an example illustrative process 1500 for providing a device with an attestation identity key and attestation certificate. At 1502, an update authority can receive, from the device, a device identity associated with the device. At 1504, the update authority can send, to the device an attestation seed.

At 1506, the update authority can generate an attestation identity key for the device. At 1508, the update authority can receive, from an attestation authority, an attestation certificate. For instance, the update authority can send a key pair and an attestation template to the attestation authority. The attestation authority can then sign an attestation certificate and send the attestation certificate to the update authority.

At 1510, the update authority can generate an attestation secret from at least one SMD using the attestation secret. For instance, the update authority can execute a KDF to generate an attestation key from a first SMD of a first software module using the attestation seed. When more than one software module is present, the update authority can execute a KDF to generate an attestation key for each of the software modules from the SMD associated with the respective software module using an attestation key that is generated by the previous software module. In some examples, the last attestation key generated by the update authority is used as the attestation secret.

At 1512, the update authority can encrypt the attestation identity key and the attestation certificate using the attestation secret. At 1514, the update authority can send, to the device, the encrypted attestation identity and attestation certificate.

Figure 16:
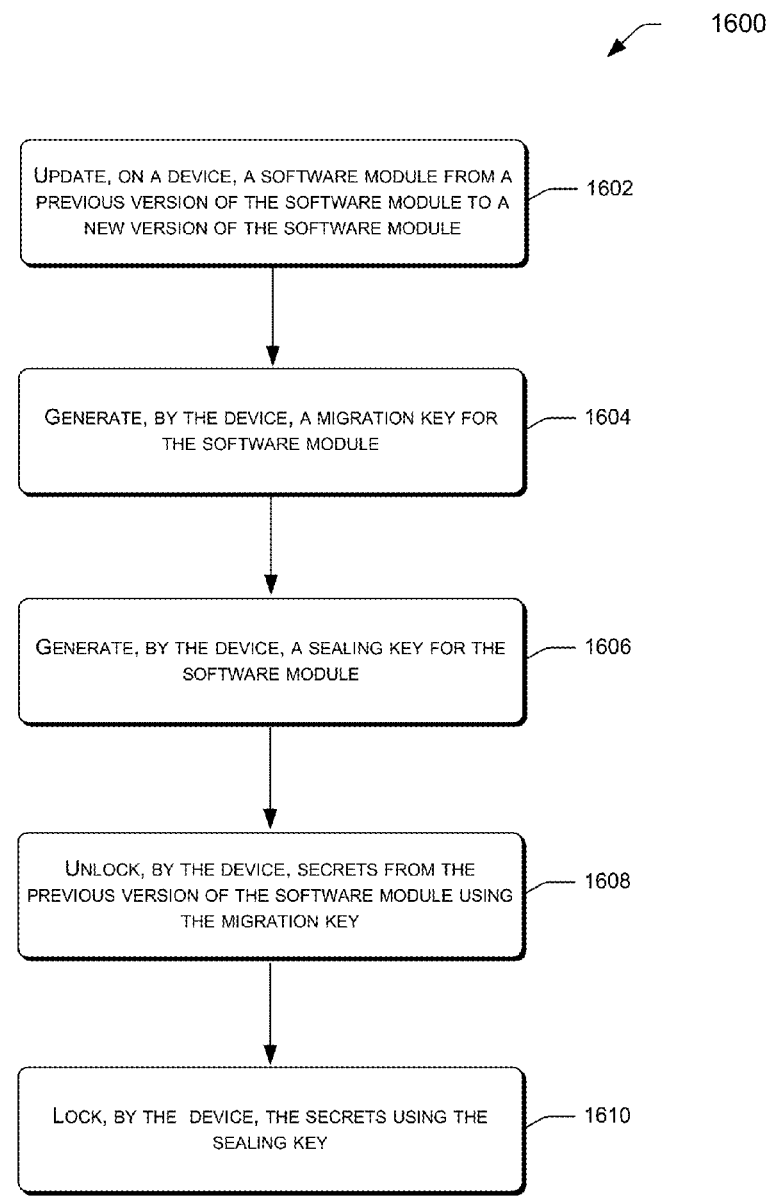
FIG. 16 is a flow diagram of an illustrative process for migrating secrets from previous versions of software modules to newer versions of software modules.

FIG. 16 is a flow diagram of an illustrative process 1600 for migrating secrets from a previous version of software module to a newer version of software module. At 1602, the device can update a software module from a previous version of the software module to a new version of the software module.

At 1604, the device can generate a migration key for the software module and at 1606, the device can generate a sealing key for the software module. For instance, the device can generate a migration key based on the SMD of the previous version of the software module. Additionally, the device can generate a sealing key based on the SMD of the newer version of the software module.

At 1608, the device can unlock secrets from the previous version of the software module using the migration key. For instance, the device can cause the new version of the software module to unlock the secrets from the previous version of the software module using the migration key. In some examples, unlocking the secrets can include generating one or more decryption keys using the migration key and decrypting the secrets using the one or more decryption keys.

At 1610, the device can lock the secrets using the sealing keys. For instance, the device can cause the new version of the software module to lock the secrets using the sealing key. In some examples, locking the secrets can include generating one or more encryption keys using the sealing key and encrypting the secrets using the one or more encryption keys.

Figure 17:
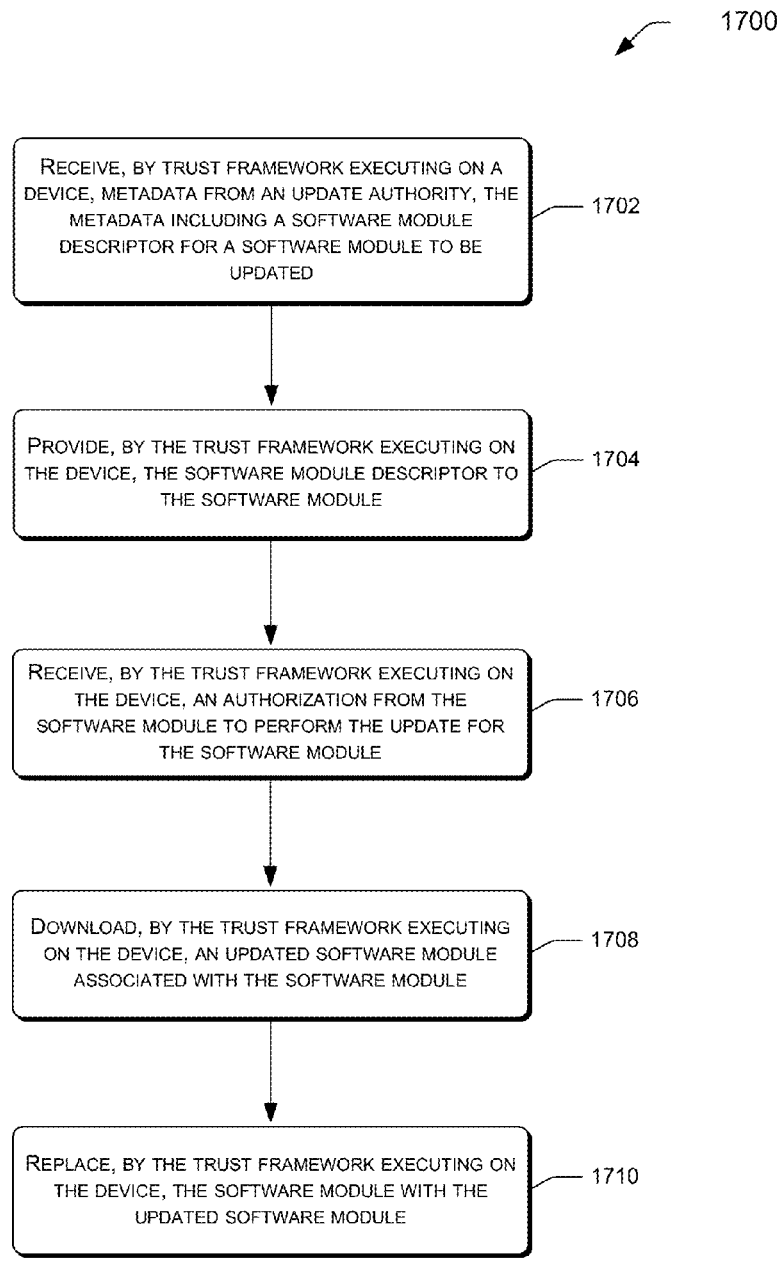
FIG. 17 is a flow diagram of an illustrative process for authorizing a software update using one or more software modules.

FIG. 17 is a flow diagram of an illustrative process 1700 for authorizing a software update using one or more software modules. At 1702, a trust framework executing on a device can receive metadata from an update authority, the metadata including a SMD for a software module to be updated.

At 1704, the trust framework executing on the device can provide the software module descriptor to the software module to be updated. At 1706, the trust framework executing on the device can receive an authorization from the software module to perform the update for the software module. For instance, the software module can use the metadata to verify that the SMD includes data that indicates the correct software module name, a latest version of the software module, and/or that the appropriate authorities signed the SMD.

At 1708, the trust framework executing on the device can download an updated software module associated with the software module and at 1710, the trust framework executing on the device can replace the software module with the updated software module.

Example Clauses

A: A device comprising: a processor; and a computer-readable medium including modules, the modules when executed by the processor, configure the device to perform a boot process, the modules comprising: a cryptographic module configured to generate, using a fuse-derived secret value, a sealing seed for re-verifying a software component that has been previously verified by the device after a software update and signed by the device using an authentication code; and a verification module configured to: retrieve a software descriptor associated with the software component; verify the software component using the software descriptor and the sealing seed; and based at least in part on verifying the software component, cause the device to continue performing the boot process.

B: A device as paragraph A recites, wherein to verify the software component using the software descriptor and the sealing seed, the verification module is configured to check the authentication code on the software descriptor using the sealing seed.

C: A device as either paragraph A or B recites, wherein the cryptographic module is further configured to generate a sealing key for the software component using the sealing seed and the software descriptor.

D: A device as any of paragraphs A-C recites, the modules further comprising a sealing module configured to seal secrets of the software component using the sealing key.

E: A device as any of paragraphs A-D recites, wherein to seal the secrets using the sealing key, the sealing module is configured to: generate one or more encryption keys using the sealing key; and encrypt the secrets of the software component using the one or more encryption keys.

F: A device as any of paragraphs A-E recites, wherein the verification module is further configured to verify an additional software component using a software descriptor associated with the additional software component and the sealing key.

G: A device as any of paragraphs A-F recites, where in the device comprises a low-resource device.

H: A computer-readable medium having computer-executable instructions to program a device to perform operations comprising: sending a device identity of the device to a distributed resource; receiving an attestation seed from the distributed resource; generating an attestation secret from at least one software module descriptor of the device using the attestation seed, the at least one software module descriptor being associated with one or more software modules on the device; generating, based at least in part on the attestation secret, an attestation statement; and sending the attestation statement to the distributed resource to obtain verification of the one or more software modules on the device.

I: A computer-readable medium as paragraph H recites, wherein the device identity includes a device public key, receiving the attestation seed comprises receiving the attestation seed encrypted by the device public key, and the operations further comprising: decrypting the encrypted attestation seed using a device private key to recover the attestation seed.

J: A computer-readable medium as either paragraph H or I recites, wherein receiving the attestation seed comprises receiving the attestation seed encrypted by an internal protector key associated with the device, and the operations further comprising: decrypting the encrypted attestation key using the internal protector key to recover the attestation seed.

K: A computer-readable medium as any of paragraphs H-J recites, wherein the one or more software modules on the device include a first software module and a second software module; and wherein executing the cryptographic function to generate the attestation secret from the at least one software module descriptor of the device using the attestation seed comprises: executing a first cryptographic function to generate an attestation key from a first software module descriptor associated with the first software module using the attestation seed; and executing a second cryptographic function to generate the attestation secret from a second software module descriptor associated with the second software module using the attestation key.

L: A computer-readable medium as any of paragraphs H-K recites, wherein the distributed resource includes at least an updating authority and a third-party entity, and the operations further comprising: receiving, from the updating authority, an attestation identity key and an attestation certificate encrypted to the attestation secret; and decrypting, using the attestation secret, the attestation identity key and the attestation certificate encrypted to the attestation secret; and wherein sending the attestation statement to the distributed resource to obtain verification of the one or more software modules on the device comprises sending the attestation certificate and the attestation statement to the third-party entity to verify the device.

M: A computer-readable medium as any of paragraphs H-L recites, wherein: the distributed resource includes at least one of an updating authority or a third-part entity; the sending of the device identity comprises sending the device identity to the updating authority; the receiving of the attestation seed comprises receiving the attestation seed from the updating authority; and the sending of the attestation statement comprises sending the attestation statement to the third-party entity, wherein sending the attestation statement to the third-party entity causes the third-party entity to send the attestation statement to an attestation authority for verification.

N: A computer-readable medium as any of paragraphs H-M recites, wherein the device comprises a low-resource device.

O: A method comprising: receiving, from a device, a device identity associated with the device; sending a software update for a software module to the device; sending an attestation seed to the device; and generating, based at least in part on the attestation seed and the software update for the software module, an attestation secret for verifying the device.

P: A method as paragraph O recites, wherein generating the attestation secret comprises executing a cryptographic function to generate the attestation secret from a software module descriptor associated with the software module using the attestation seed.

Q: A method as either paragraph O or P recites, wherein the device identity includes a device public key associated with the device, and wherein, before sending the attestation seed to the device, the method further comprises encrypting the attestation seed using the device public key.

R: A method as any of paragraphs O-Q recites, wherein before sending the attestation seed to the device, the method further comprises: sending, to an identity authority, the device identity associated with the device; receiving, from the identity authority, a message verifying an identity of the device; and encrypting the attestation seed using an internal protector key associated with the device.

S: A method as any of paragraphs O-R recites, further comprising: generating an attestation identity key; receiving an attestation certificate; encrypting the attestation identity key and the attestation certificate using the attestation secret; and sending, to the device, the attestation identity key and the attestation certificate encrypted to the attestation secret.

T: A method as any of paragraphs O-S recites, wherein the device comprises a low-resource device.

U: A computer-readable medium having computer-executable instructions thereon, the computer-executable instructions to configure a computer to perform a method as any of paragraphs O-T recites.

V: A device comprising: a computer-readable media having computer-executable instructions thereon to configure a computer to perform a method as any of paragraphs O-T recites, the processing unit adapted to execute the instructions to perform the method as any of paragraphs O-T recites.

W: A system comprising: means for generating, using a fuse-derived secret value, a sealing seed for re-verifying a software component that has been previously verified by the device after a software update and signed by the device using an authentication code; means for retrieving a software descriptor associated with the software component; means for verifying the software component using the software descriptor and the sealing seed; and based at least in part on verifying the software component, means for causing the device to continue performing the boot process.

X: A system as paragraph W recites, wherein to verify the software component using the software descriptor and the sealing seed, the system comprises a means for checking the authentication code on the software descriptor using the sealing seed.

Y: A system as either paragraph W or X recites, further comprising means for generating a sealing key for the software component using the sealing seed and the software descriptor.

Z: A system as any of paragraphs W-Y recites, further comprising means for sealing secrets of the software component using the sealing key.

AA: A system as any of paragraphs W-Z recites, wherein to seal the secrets using the sealing key, the system further comprises a means for generating one of more encryption keys using the sealing key; and means for encrypting the secrets of the software component using the one or more encryption keys.

AB: A system as any of paragraphs W-AA recites, further comprising means for verifying an additional software component using a software descriptor associated with the additional software component and the sealing key.

AC: A system as any of paragraphs W-AB recites, where in the device comprises a low-resource device.

AD: A device comprising: a processor; and a computer-readable medium including modules, the modules when executed by the processor, configure the device to perform a secure boot process based at least in part on receiving an update for software, the modules comprising: a cryptographic module configured to secure the device by: generating a sealing seed; generating a migration key based at least in part on the sealing seed and at least one software descriptor associated with a previous version of the software; and generating a sealing key based at least in part on the sealing seed and at least one software descriptor associated with a new version of the software.

AE: A device as paragraph AD recites, wherein: the cryptographic module is configured to execute a cryptographic function to generate the migration key from the at least one software descriptor associated with the previous version of the software using the sealing seed; and the cryptographic module is configured to execute a cryptographic function to generate the sealing key from the at least one software descriptor associated with the new version of the software using the sealing seed.

AF: A device as either paragraph AD or AE recites, wherein: the software includes a first software component and a second software component; to generate the migration key, the cryptographic module is configured to: execute a first cryptographic function to generate an intermediate migration key from a first software descriptor associated with a previous version of the first software component using the sealing seed; and execute a second cryptographic function to generate the migration key from a second software descriptor associated with a previous version of the second software component using the intermediate migration key; and to generate the sealing key, the cryptographic module is configured to: execute a third cryptographic function to generate an intermediate sealing key from a first software descriptor associated with a new version of the first software component using the sealing seed; and execute a fourth cryptographic function to generate the sealing key from a second software descriptor associated with a new version of the second software component using the intermediate key.

AG: A device as any of paragraphs AD-AF recites, wherein to generate the sealing seed, the cryptographic module is configured to hash a concatenation of a fuse-derived secret of the device to a device sealing constant.

AH: A device as any of paragraphs AD-AG recites, the modules further comprising a migration module configured to retrieve secrets associated with the previous version of the software using the migration key.

AI: A device as any of paragraphs AD-AH recites, wherein the cryptographic module is further configured to generate one or more decryption keys using the migration key, and wherein to retrieve the secrets the migration module is configured to decrypt the secrets using the one or more decryption keys.

AJ: A device as any of paragraphs AD-AI recites, the modules further comprising a sealing module configured to seal the secrets for the new version of the software using the sealing key.

AK: A device as any of paragraphs AD-AJ recites, wherein the cryptographic module is further configured to generate one or more encryption keys using the sealing key, and wherein to seal the secrets the sealing module is configured to encrypt the secrets using the one or more encryption keys.

AL: A method comprising: receiving an update for a software; generating a sealing seed; generating a migration key based at least in part on the sealing seed and at least one software descriptor associated with a previous version of the software; and generating a sealing key based at least in part on the sealing seed and at least one software descriptor associated with a new version of the software.

AM: A method as paragraph AL recites, wherein: generating the migration key comprises executing a cryptographic function to generate the migration key from the at least one software descriptor associated with the previous version of the software using the sealing seed; and generating the sealing key comprises executing a cryptographic function to generate the sealing key from the at least one software descriptor associated with the new version of the software using the sealing seed.

AN: A method as either paragraph AL or AM recites, wherein: the software includes a first software module and a second software module; generating the migration key comprises: executing a first cryptographic function to generate an intermediate migration key from a first software descriptor associated with a previous version of the first software module using the sealing seed; and executing a second cryptographic function to generate the migration key from a second software descriptor associated with a previous version of the second software module using the intermediate migration key; and generating the sealing key comprises: executing a third cryptographic function to generate an intermediate sealing key from a first software descriptor associated with a new version of the first software module using the sealing seed; and executing a fourth cryptographic function to generate the sealing key from a second software descriptor associated with a new version of the second software module using the intermediate key.

AO: A method as any of paragraphs AL-AN recites, wherein to generate the sealing seed, the method comprises hashing a concatenation of a fuse-derived secret of the device to a device sealing constant.

AP: A method as any of paragraphs AL-AO recites, further comprising retrieving secrets associated with the previous version of the software using the migration key.

AQ: A method as any of paragraphs AL-AP recites, further comprising generating one or more decryption keys using the migration key, and wherein retrieving the secrets comprises decrypting the secrets using the one or more decryption keys.

AR: A method as any of paragraphs AL-AQ recites, further comprising sealing the secrets for the new version of the software using the sealing key.

AS: A method as any of paragraphs AL-AR recites, further comprising generating one or more encryption keys using the sealing key, and wherein sealing the secrets comprises encrypting the secrets using the one or more encryption keys.

AT: A computer-readable medium having computer-executable instructions thereon, the computer-executable instructions to configure a computer to perform a method as any of paragraphs AL-AR recites.

AU: A device comprising: a computer-readable media having computer-executable instructions thereon to configure a computer to perform a method as any of paragraphs AL-AR recites, the processing unit adapted to execute the instructions to perform the method as any of paragraphs AL-AR recites.

AV: A computer-readable medium having computer-executable instructions to program a device to perform operations comprising: receiving an update for a software; generating a sealing seed; generating a migration key based at least in part on the sealing seed and at least one software descriptor associated with a previous version of the software; and generate a sealing key based at least in part on the sealing seed and at least one software descriptor associated with a new version of the software.

AW: A computer-readable medium as paragraph AV recites, wherein: generating the migration key comprises executing a cryptographic function to generate the migration key from the at least one software descriptor associated with the previous version of the software using the sealing seed; and generating the sealing key comprises executing a cryptographic function to generate the sealing key from the at least one software descriptor associated with the new version of the software using the sealing seed.

AX: A computer-readable medium as either paragraph AV or AW recites, the operations further comprising retrieving secrets associated with the previous version of the software using the migration key.

AY: A computer-readable medium as any of paragraphs AV-AX recites, the operations further comprising sealing the secrets for the new version of the software using the sealing key.

AZ: A system comprising: a means for generating a sealing seed; a means for generating a migration key based at least in part on the sealing seed and at least one software descriptor associated with a previous version of the software; and a means for generating a sealing key based at least in part on the sealing seed and at least one software descriptor associated with a new version of the software.

BA: A system as paragraph AZ recites, further comprising a means for executing a cryptographic function to generate the migration key from the at least one software descriptor associated with the previous version of the software using the sealing seed; and a means for executing a cryptographic function to generate the sealing key from the at least one software descriptor associated with the new version of the software using the sealing seed.

BB: A system as either paragraph AZ or BA recites, wherein: the software includes a first software component and a second software component; to generate the migration key, the system comprises a means for executing a first cryptographic function to generate an intermediate migration key from a first software descriptor associated with a previous version of the first software component using the sealing seed; and a means for executing a second cryptographic function to generate the migration key from a second software descriptor associated with a previous version of the second software component using the intermediate migration key; and to generate the sealing key, the system comprises a means for executing a third cryptographic function to generate an intermediate sealing key from a first software descriptor associated with a new version of the first software component using the sealing seed; and a means for executing a fourth cryptographic function to generate the sealing key from a second software descriptor associated with a new version of the second software component using the intermediate key.

BC: A system as any of paragraphs AZ-BB recites, wherein to generate the sealing seed, the system comprises a means for hashing a concatenation of a fuse-derived secret of the device to a device sealing constant.

BD: A system as any of paragraphs AZ-AC recites, further comprising a means for retrieving secrets associated with the previous version of the software using the migration key.

BE: A system as any of paragraphs AZ-BD recites, further comprising a means for generating one or more decryption keys using the migration key, and wherein to retrieve the secrets the system comprises a means for decrypting the secrets using the one or more decryption keys.

BF: A system as any of paragraphs AZ-BE recites, further comprising a means for sealing the secrets for the new version of the software using the sealing key.

BG: A system as any of paragraphs AZ-BF recites, further comprising a means for generating one or more encryption keys using the sealing key, and wherein to seal the secrets the system comprises a means for encrypting the secrets using the one or more encryption keys.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, 204, 220, 234, 248, 300, 400, 500, 902, and/or 1002, such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device comprising:
   a processor; and
   a computer-readable storage device including modules, the modules when executed by the processor, configure the device to perform a secure boot process based at least in part on receiving an update for software, the modules comprising:
      a cryptographic module configured to secure the device by:
         generating a sealing seed, based at least in part on a fuse-derived secret value of the device, by hashing a concatenation of the fuse-derived secret value of the device to a device sealing constant;
         generating a migration key based at least in part on the sealing seed and at least one software descriptor associated with a previous version of the software;
         generating a sealing key based at least in part on the sealing seed and at least one software descriptor associated with a new version of the software, wherein the sealing key is used to generate one or more encryption keys; and
         encrypting secrets of the software based on the generating sealing key.

2. A device as claim 1 recites, wherein:
   the cryptographic module is configured to execute a cryptographic function to generate the migration key from the at least one software descriptor associated with the previous version of the software using the sealing seed; and
   the cryptographic module is configured to execute a cryptographic function to generate the sealing key from the at least one software descriptor associated with the new version of the software using the sealing seed.

3. A device as claim 1 recites, wherein:
   the software includes a first software component and a second software component;
   to generate the migration key, the cryptographic module is configured to:
      execute a first cryptographic function to generate an intermediate migration key from a first software descriptor associated with a previous version of the first software component using the sealing seed; and
      execute a second cryptographic function to generate the migration key from a second software descriptor associated with a previous version of the second software component using the intermediate migration key; and
   to generate the sealing key, the cryptographic module is configured to:
      execute a third cryptographic function to generate an intermediate sealing key from a first software descriptor associated with a new version of the first software component using the sealing seed; and execute a fourth cryptographic function to generate the sealing key from a second software descriptor associated with a new version of the second software component using the intermediate key.

4. A device as claim 1 recites, the modules further comprising a migration module configured to retrieve secrets associated with the previous version of the software using the migration key.

5. A device as claim 4 recites, wherein the cryptographic module is further configured to generate one or more decryption keys using the migration key, and wherein to retrieve the secrets the migration module is configured to decrypt the secrets using the one or more decryption keys.

6. A device as claim 4 recites, the modules further comprising a sealing module configured to seal the secrets for the new version of the software using the sealing key.

7. A device as claim 6 recites, wherein the cryptographic module is further configured to generate one or more encryption keys using the sealing key, and wherein to seal the secrets the sealing module is configured to encrypt the secrets using the one or more encryption keys.

8. A method comprising:
receiving an update for a software;
generating a sealing seed, based at least in part on a fuse-derived secret value of a device executing the software, by hashing a concatenation of the fuse-derived secret value of the device to a device sealing constant;
generating a migration key based at least in part on the sealing seed and at least one software descriptor associated with a previous version of the software;
generating a sealing key based at least in part on the sealing seed and at least one software descriptor associated with a new version of the software, wherein the sealing key is used to generate one or more encryption keys; and
encrypting secrets of the software based on the generating sealing key;
wherein the above steps are performed by the device.

9. A method as claim 8 recites, wherein:
generating the migration key comprises executing a cryptographic function to generate the migration key from the at least one software descriptor associated with the previous version of the software using the sealing seed; and
generating the sealing key comprises executing a cryptographic function to generate the sealing key from the at least one software descriptor associated with the new version of the software using the sealing seed.

10. A method as claim 8 recites, wherein:
the software includes a first software module and a second software module;
generating the migration key comprises:
executing a first cryptographic function to generate an intermediate migration key from a first software descriptor associated with a previous version of the first software module using the sealing seed; and
executing a second cryptographic function to generate the migration key from a second software descriptor associated with a previous version of the second software module using the intermediate migration key; and generating the sealing key comprises:
executing a third cryptographic function to generate an intermediate sealing key from a first software descriptor associated with a new version of the first software module using the sealing seed; and
executing a fourth cryptographic function to generate the sealing key from a second software descriptor associated with a new version of the second software module using the intermediate key.

11. A method as claim 8 recites, further comprising retrieving secrets associated with the previous version of the software using the migration key.

12. A method as claim 11 recites, further comprising generating one or more decryption keys using the migration key, and wherein retrieving the secrets comprises decrypting the secrets using the one or more decryption keys.

13. A method as claim 11 recites, further comprising sealing the secrets for the new version of the software using the sealing key.

14. A method as claim 13 recites, further comprising generating one or more encryption keys using the sealing key, and wherein sealing the secrets comprises encrypting the secrets using the one or more encryption keys.

15. A computer-readable storage device having computer-executable instructions to program a device to perform operations comprising:
receiving an update for a software;
generating a sealing seed, based at least in part on a fuse-derived secret value of the device, by hashing a concatenation of the fuse-derived secret value of the device to a device sealing constant;
generating a migration key based at least in part on the sealing seed and at least one software descriptor associated with a previous version of the software;
generate a sealing key based at least in part on the sealing seed and at least one software descriptor associated with a new version of the software, wherein the sealing key is used to generate one or more encryption keys; and
encrypting secrets of the software based on the generating sealing key.

16. A computer-readable storage device as claim 15 recites, wherein:
generating the migration key comprises executing a cryptographic function to generate the migration key from the at least one software descriptor associated with the previous version of the software using the sealing seed; and
generating the sealing key comprises executing a cryptographic function to generate the sealing key from the at least one software descriptor associated with the new version of the software using the sealing seed.

17. A computer-readable storage device as claim 15 recites, the operations further comprising retrieving secrets associated with the previous version of the software using the migration key.

18. A computer-readable storage device as claim 17 recites, the operations further comprising sealing the secrets for the new version of the software using the sealing key.

* * * * *